US010938116B2

(12) United States Patent
Lee et al.

(10) Patent No.: US 10,938,116 B2
(45) Date of Patent: Mar. 2, 2021

(54) REFLECTOR FOR CHANGING DIRECTIONALITY OF WIRELESS COMMUNICATION BEAM AND APPARATUS INCLUDING THE SAME

(71) Applicant: Samsung Electronics Co., Ltd., Suwon-si (KR)

(72) Inventors: Jungyub Lee, Yongin-si (KR); Junsig Kum, Yongin-si (KR); Yoongeon Kim, Suwon-si (KR); Byungchul Kim, Seongnam-si (KR); Youngju Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 15/975,155

(22) Filed: May 9, 2018

(65) Prior Publication Data

US 2018/0337459 A1     Nov. 22, 2018

(30) Foreign Application Priority Data

May 18, 2017    (KR) .................. 10-2017-0061891
Jun. 16, 2017    (KR) .................. 10-2017-0076914

(51) Int. Cl.
*H01Q 15/14*      (2006.01)
*H01Q 19/10*      (2006.01)
(Continued)

(52) U.S. Cl.
CPC .......... *H01Q 15/141* (2013.01); *H01Q 15/14* (2013.01); *H01Q 19/10* (2013.01); *H01Q 1/1221* (2013.01); *H01Q 3/46* (2013.01); *H01Q 15/16* (2013.01)

(58) Field of Classification Search
CPC .......... H01Q 15/14; H01Q 19/10; H01Q 1/12; H01Q 3/46; H01Q 15/16
(Continued)

(56) References Cited

U.S. PATENT DOCUMENTS

| 5,697,063 A | 12/1997 | Kishigami et al. |
| 7,164,932 B1 | 1/2007 | Sato et al. |
| (Continued) | | |

FOREIGN PATENT DOCUMENTS

| CN | 101114881 A | 1/2008 |
| CN | 101194519 A | 6/2008 |
| (Continued) | | |

OTHER PUBLICATIONS

International Search Report dated Aug. 17, 2018, issued in International Application No. PCT/KR2018/005488.
(Continued)

*Primary Examiner* — Andrea Lindgren Baltzell
(74) *Attorney, Agent, or Firm* — Jefferson IP Law, LLP

(57) ABSTRACT

Techniques related to a $5^{th}$ generation (5G) or pre-5G communication system to support higher data rates after a $4^{th}$ generation (4G) communication system such as long term evolution (LTE) ae provided. A reflector is provided that is configured to change a direction of a beam incident in a first direction to a second direction different from the first direction, so that a receiving entity positioned in a shadow area caused by an object can receive the beam. Therefore, the reflector removes the shadow area at which the beam does not arrive in a 5G wireless communication system.

20 Claims, 40 Drawing Sheets

(51) Int. Cl.
*H01Q 15/16* (2006.01)
*H01Q 3/46* (2006.01)
*H01Q 1/12* (2006.01)

(58) Field of Classification Search
USPC ......................................................... 343/912
See application file for complete search history.

(56) References Cited

U.S. PATENT DOCUMENTS

| | | |
|---|---|---|
| 2006/0221904 A1 | 10/2006 | Sharony |
| 2009/0079645 A1 | 3/2009 | Sotelo et al. |
| 2010/0001918 A1 | 1/2010 | Svensson et al. |
| 2010/0033390 A1 | 2/2010 | Alamouti et al. |
| 2010/0119234 A1 | 5/2010 | Suematsu et al. |
| 2010/0194657 A1 | 8/2010 | Maruyama et al. |
| 2012/0050127 A1 | 3/2012 | Maruyama et al. |
| 2012/0154239 A1 | 6/2012 | Bar-Sade et al. |
| 2013/0229296 A1 | 9/2013 | Maruyama et al. |
| 2014/0187179 A1 | 7/2014 | Ferguson |
| 2016/0352021 A1 | 12/2016 | Kim et al. |
| 2016/0359224 A1 | 12/2016 | Mellor |

FOREIGN PATENT DOCUMENTS

| | | | |
|---|---|---|---|
| JP | S58-221503 A | 12/1983 | |
| JP | 05-175933 A | 7/1993 | |
| JP | 2003-298485 A | 10/2003 | |
| JP | 2004-056457 A | 2/2004 | |
| JP | 2007-274147 A | 10/2007 | |
| KR | 10-1319216 B1 | 10/2013 | |
| KR | 10-2017-0025422 A | 3/2017 | |
| KR | 101848079 B1 * | 4/2018 | ............ H01Q 15/00 |
| WO | 2014/105258 A1 | 7/2014 | |

OTHER PUBLICATIONS

Anonymous, "venstergl as—Bert A Itena", Mar. 21, 2011, XP055705341, Retrieved from the Internet: URL: http://www.bertaltena.com/vensterglas/ [retrieved on Jun. 16, 2020], figure 1.
Anonymous, "Zaterdag Oct. 22, 2016: Het spionnetje als buurt antenne?—cocklodderorg.nl", cocklodderorg.nl, Oct. 22, 2016, XP055705345, Retrieved from the Internet: URL: https://www.cocklodderorg.nl/uncategorized/zaterdag-22-oktober-2016-het-spionnetje-als-buurt-antenne/ [retrieved on Jun. 16, 2020], figures 2-4.
Anonymous, "Gadespej 1", Aug. 18, 2016, XP055705351, Retrieved from the Internet: URL: https://web.archive.org/web/20160818143751/ https://www.b1ik-staa1.dk/gadespej1.htm [retrieved on Jun. 16, 2020], Figs 1-3 on p. 1 and Figs. on p. 2.
Murawwat Sadia et al., "An Overview of 15 LiFi: a 5G candidateTechno1 ogy", 2018 International Symposium on Recent Advances in Electrical Engineering (RAEE), IEEE, Oct. 17, 2018, pp. 1-6, XP033545564, DOI: 10.1109/RAEE.2018.8706906 [retrieved on May 3, 2019], abstract.
Extended European Search Report dated Jun. 29, 2020, issued in European Patent Application No. 18801669.5.
Partial Supplementary European Search Report dated Mar. 18, 2020, issued in European Patent Application No. 18801669.5.
Chinese Office Action dated Sep. 29, 2020, issued in Chinese Patent Application No. 201880026315.X.

* cited by examiner

[Streetlight Type]

[Wall-mounted Type]

[Stand Type]

FIG. 6D

| Use Case | @CPE | | | @AU | | | Standalone | | |
|---|---|---|---|---|---|---|---|---|---|
| | Size [cm] | Coverage [L] | Reflector Loss | Size [cm] | Coverage [L] | Reflector Loss | Size [cm] | Coverage [L] | Reflector Loss |
| Planar Reflector | 10x10 | 5 cm | +3 dB | 10x10 | 45 cm | +4 dB | 10x10 | 33 cm | +4.8 dB |
| Conical Reflector 60 deg. sector | 10x10 | 46 cm | -7.6 dB | 10x10 | 3.9 m | -6.8 dB | 10x10 | 5.2 m | -8.3 dB |
| Conical Reflector 90 deg. sector | 10x10 | 64 cm | -9.9 dB | 10x10 | 5.5 m | -8.8 dB | 10x10 | 8 m | -11.2 dB |

REFLECTOR FOR CHANGING DIRECTIONALITY OF WIRELESS COMMUNICATION BEAM AND APPARATUS INCLUDING THE SAME

CROSS-REFERENCE TO RELATED APPLICATION(S)

This application is based on and claims priority under 35 U.S.C. § 119(a) of a Korean patent application number 10-2017-0061891, filed on May 18, 2017, in the Korean Intellectual Property Office, and of a Korean patent application number 10-2017-0076914, filed on Jun. 16, 2017, in the Korean Intellectual Property Office, the disclosure of each of which is incorporated by reference herein in its entirety.

BACKGROUND

1. Field

The disclosure relates to a reflector for changing a directionality of a $5^{th}$ generation (5G) wireless communication beam and an apparatus including the reflector.

2. Description of Related Art

In order to satisfy the increasing demands of radio data traffic after the commercialization of a $4^{th}$ generation (4G) communication system, efforts have been made to develop an advanced 5G communication system or a pre-5G communication system. For this reason, the 5G communication system or the pre-5G communication system is also referred to as a beyond-4G network communication system or a post-long term evolution (LTE) system.

In order to meet the needs of a higher data transfer rate, implementation of the 5G communication system at a super-high frequency millimeter wave (mmWave) band (e.g., such as a 60 GHz band) is being considered. In order to obviate a path loss of a radio wave and increase a delivery distance of a radio wave at the super-high frequency band, discussions are underway about various techniques such as a beamforming, a massive multiple input multiple output (MIMO), a full dimensional MIMO (FD-MIMO), an array antenna, an analog beam-forming, and a large scale antenna for the 5G communication system.

Additionally, for an improvement in the network of the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like.

Besides, in the 5G communication system, a hybrid frequency-shift keying (FSK) and quadrature amplitude modulation (QAM) modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also being developed as advanced access techniques.

Meanwhile, the 5G wireless communication system transmits a signal by using a beam formed through beamforming in a super-high frequency (mmWave) band. Unfortunately, this may cause a shadow area at which the beam does not arrive, depending on the position of a receiver.

Therefore, there is a need for a method of removing the shadow area in the 5G wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a technique to mitigate a shadow area at which a beam does not arrive in a $5^{th}$ generation (5G) wireless communication system.

Additional aspects will be set forth in part in the description which follows and, in part, will be apparent from the description, or may be learned by practice of the presented embodiments.

In accordance with an aspect of the disclosure, a reflector is provided. The reflector may be configured to change a direction of a beam incident in a first direction to a second direction, whereby a receiver spaced apart from an object receives the beam.

In accordance with another aspect of the disclosure, an apparatus is provided. The apparatus includes a reflector and a fixing member. The reflector may be configured to change a direction of a beam incident in a first direction to a second direction, whereby a receiver spaced apart from an object receives the beam. The fixing member may be configured to fix the reflector to a specific position.

According to embodiments of the disclosure, it is possible to remove a shadow area at which a beam does not arrive in a 5G wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B, 6C, and 6D are diagrams illustrating a possible shape and resultant effect of a reflection apparatus according to various embodiments of the disclosure;

Throughout the drawings, like reference numerals will be understood to refer to like parts, components, and structures.

DETAILED DESCRIPTION

Figure 1A:
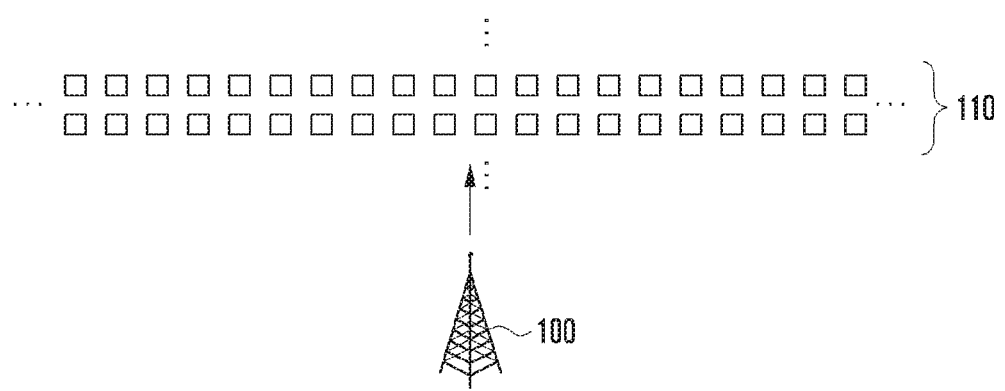
FIGS. 1A and 1B are diagrams illustrating beam transmission situations depending on $5^{th}$ generation (5G) base station deployment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements in the drawings are exaggerated, omitted, or schematically illustrated. Also, the size of each element does not entirely reflect the actual size. In the drawings, the same or corresponding elements are denoted by the same reference numerals.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a non-transitory computer usable or computer-readable memory that may direct a computer or other programmable data processing apparatus to function in a particular manner, such that the instructions stored in the non-transitory computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In this disclosure, a terminal may include a mobile terminal and also may indicate a device that has subscribed to a mobile communication system and receives a service from the mobile communication system. The mobile terminal may include, but is not limited to, a smart phone, a tablet PC, or any other smart device.

In the following description, terms for identifying access nodes, terms for indicating network entities, terms for indicating messages, terms for indicating interfaces between network entities, terms for indicating various kinds of identification information, etc. are various only and are not to be construed as a limitation. Other terms having equivalent technical meanings may be also used.

For convenience in explanation, the following description uses terms and names defined in the 3rd generation partnership project long term evolution (3GPP LTE) standard. However, the disclosure is not limited to the following description and may be equally applied to any other system that conforms to other standards.

Now, the structure of the next generation mobile communication system to which the disclosure is applicable will be described. A radio access network of the next generation mobile communication system (also referred to as a new radio (NR) system or 5th generation (5G) system) includes a next generation base station (also referred to as a new radio node B, an NR gNB, or an NR base station) and a new radio core network (NR CN). A user terminal (also referred to as new radio user equipment (NR UE) or simply a terminal) accesses an external network through the NR gNB and the NR CN.

The NR gNB corresponds to evolved node B (eNB) of the existing long term evolution (LTE) system. The NR gNB is connected to the NR UE through a radio channel and can provide a better service than the existing node B. In the next generation mobile communication system, because all user traffic is provided through a shared channel, a device is used for collecting various kinds of state information, such as buffer states, available transmission power states, and channel states of NR UEs, and then performing scheduling. This is performed by the NR gNB. Normally, one NR gNB controls a plurality of cells. In order to realize high-speed data transfer compared with the existing LTE, more than the existing maximum bandwidth may be applied, and also a beamforming technique may be used with orthogonal frequency division multiplexing (OFDM) as a radio access technology. In addition, an adaptive modulation and coding (AMC) scheme is used to determine a modulation scheme and a channel coding rate according to a channel state of the NR UE. The NR CN performs functions such as mobility support, bearer setup, and quality of service (QoS) setup. The NR CN is a device for performing various control functions as well as a mobility management function for the NR UE, and it is connected to a plurality of NR gNBs. Also, the next generation mobile communication system may be linked to the existing LTE system, and the NR CN is connected to a mobility management entity (MME) through a network interface. The MME is connected to the eNB, which is the existing base station.

Hereinafter, a base station according to embodiments may refer to a 5G base station that transmits a signal by using a beam formed through beamforming in a super-high frequency (mmWave) band as described above.

Figure 1B:
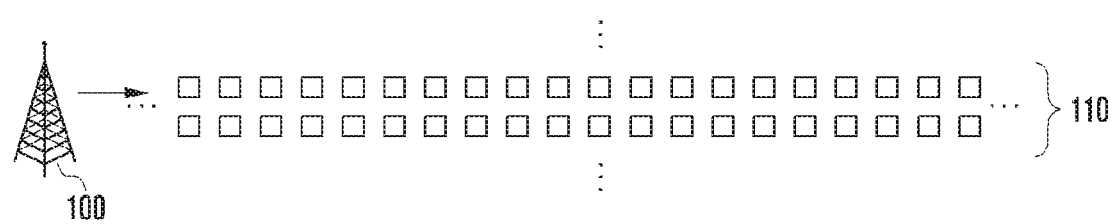

FIGS. 1A and 1B are diagrams illustrating beam transmission situations depending on 5G base station deployment according to various embodiments of the disclosure. Referring to FIGS. 1A and 1B, a base station 100 transmitting beams and a plurality of receiving entities 110 is shown.

The receiving entity 110 may be customer-premises equipment (CPE) associated with all terminals connected to a service of a communication service provider and connected to devices in a building via a local access network (LAN). The CPE may be regarded as a terminal fixed at a certain position. The receiving entity 110 may be a building such as a house including at least one of the terminal or the CPE.

For example, if the receiving entity 110 is a building having the CPE installed externally, it may be advantageous for the base station 100 to transmit a beam in the direction shown in FIG. 1B rather than in the direction shown in FIG. 1A. The reason is that because the beam is transmitted from the base station in a uniform direction by beamforming, the beam transmitted in the direction shown in FIG. 1B can arrive at more buildings.

On the other hand, if the receiving entity 110 is a building having the CPE installed internally, the beam transmitted from the base station in the direction shown in FIG. 1B may be lost while penetrating windows of the building.

For example, it is assumed that the building has windows in the direction of the beam transmitted from the base station. In this case, the beam transmitted by the base station shown in FIG. 1B may be reflected by the window and thus suffer a loss. This beam loss caused by reflection may be increased depending on an incident angle of the beam with respect to the window.

Therefore, if the amount of beam reflection increases through the window of the building according to the incidence direction of the beam, the reception rate of 5G signals decreases inside the building. In this case, the inside of the building may become a shadow area for the 5G signal.

FIGS. 2A, 2B, 2C, 2D, 2E, and 2F are diagrams illustrating a method for installing a reflection apparatus, together with various types of reflectors thereof, to remove a shadow area caused by an object blocking a beam penetration according to various embodiments of the disclosure.

Figure 2A:
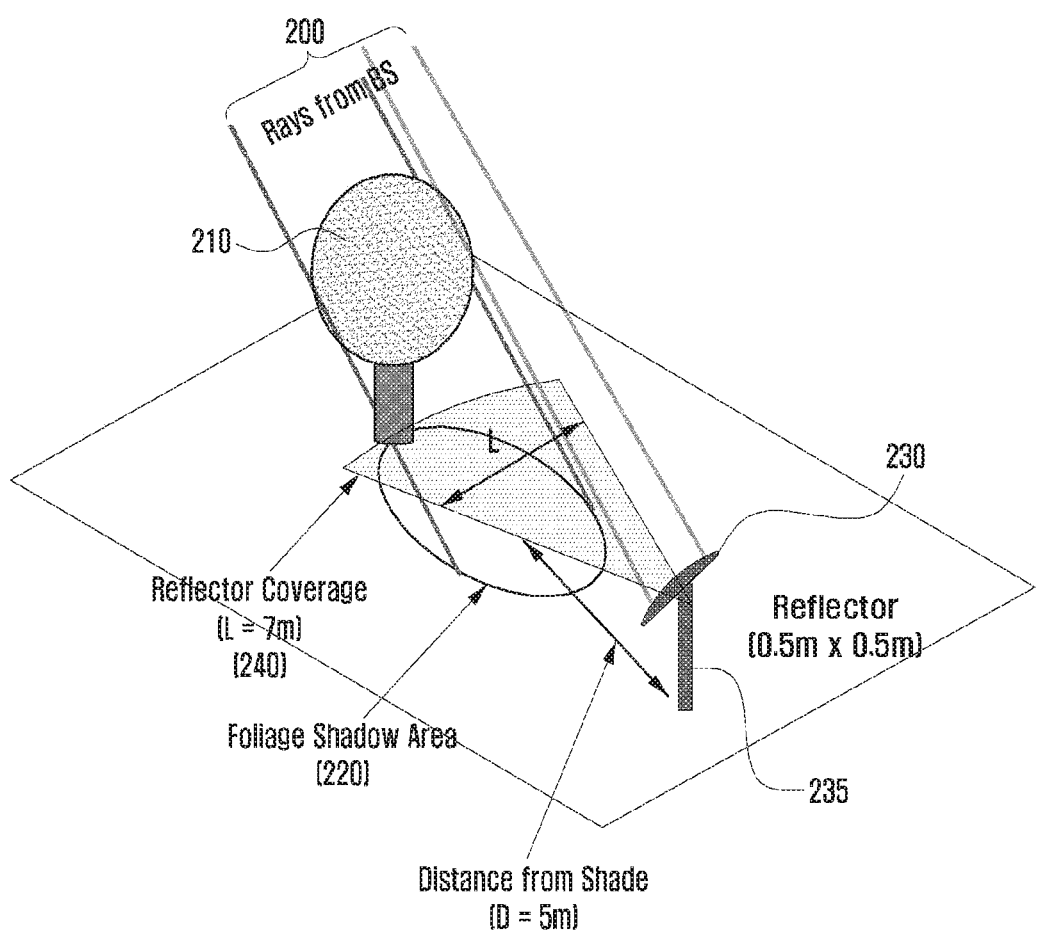
FIGS. 2A, 2B, 2C, 2D, 2E, and 2F are diagrams illustrating a method for installing a reflection apparatus, together with various types of reflectors thereof, to remove a shadow area caused by an object blocking a beam penetration according to various embodiments of the disclosure.

Referring to FIG. 2A, when there is a certain object 210 such as a tree that disallows the penetration of a 5G beam 200, a portion blocked by the object 210 with respect to the transmission direction of the 5G beam 200 may be a shadow area 220. For example, if a building is located in the shadow area 220, the reception rate of the 5G beam 200 may be reduced in the building.

Accordingly, the disclosure proposes a method for removing, for a 5G signal, a shadow area that can be produced because of reflection or non-penetration of the 5G beam at a specific position.

Specifically, FIGS. 2A to 2F are diagrams illustrating a method for installing a reflection apparatus, together with various types of reflectors thereof, to remove a shadow area caused by an object blocking a beam penetration.

Referring to FIG. 2A, the reflection apparatus may be located on the opposite side of a source (e.g., a base station) of the 5G beam 200 with respect to the object 210. The reflection apparatus may include a reflector 230 and a support 235. The reflector 230 may be fixed to the ground or a portion of a building through the support 235.

Depending on the size, shape, and angle of the reflector 230, a reflector coverage 240 may be obtained. Thus, the 5G beam 200 may be transmitted through the reflector 230 to a receiving entity that exists within the reflector coverage 240. For example, the reflector 230 allows the 5G beam 200 to be transmitted to a terminal, a CPE, and a building containing a terminal or CPE, all of which exist in the reflector coverage 240.

Figure 2B:
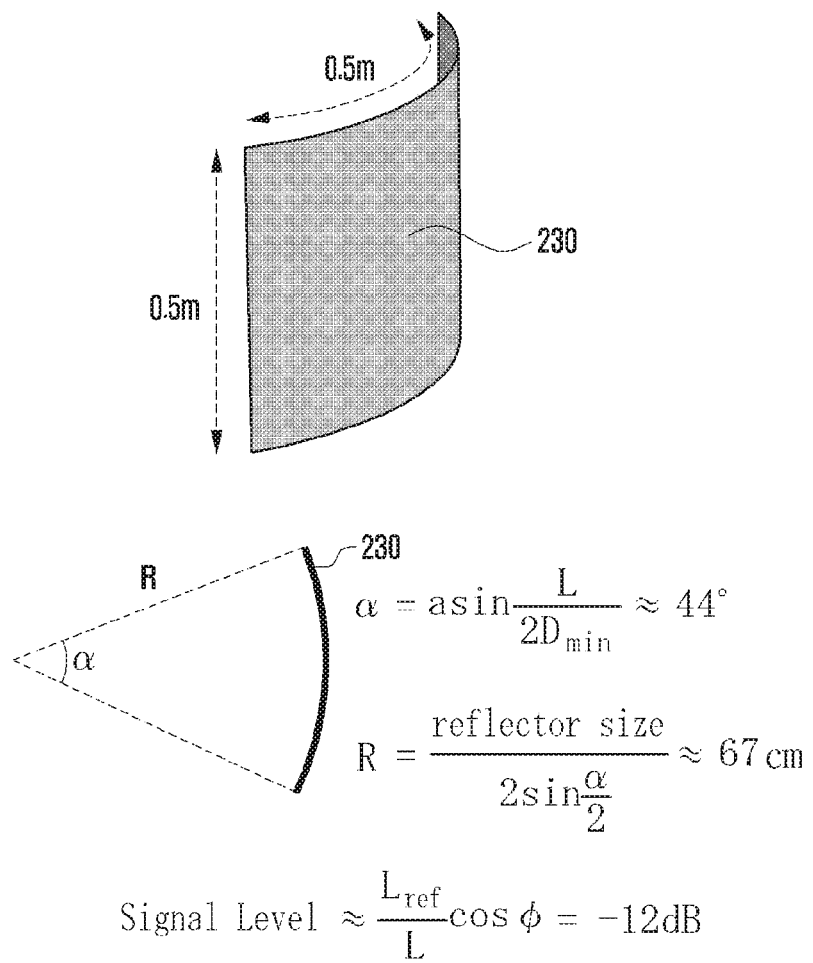

Referring to FIG. 2B shows a shape of the reflector 230. As shown, the reflector 230 may be a metal plate having a certain size and curved with a certain curvature.

As shown in FIG. 2B, for example, the reflector 230 may be 0.5 meters in length and width. Also, the reflector 230 may be formed in an arc shape, for example, having a center angle of 44 degrees and a radius of 67 centimeters.

Alternatively, the reflector 230 may be formed in a planar shape. Even though having a planar shape, the reflector 230 may disperse the 5G beam at various angles.

Figure 2C:
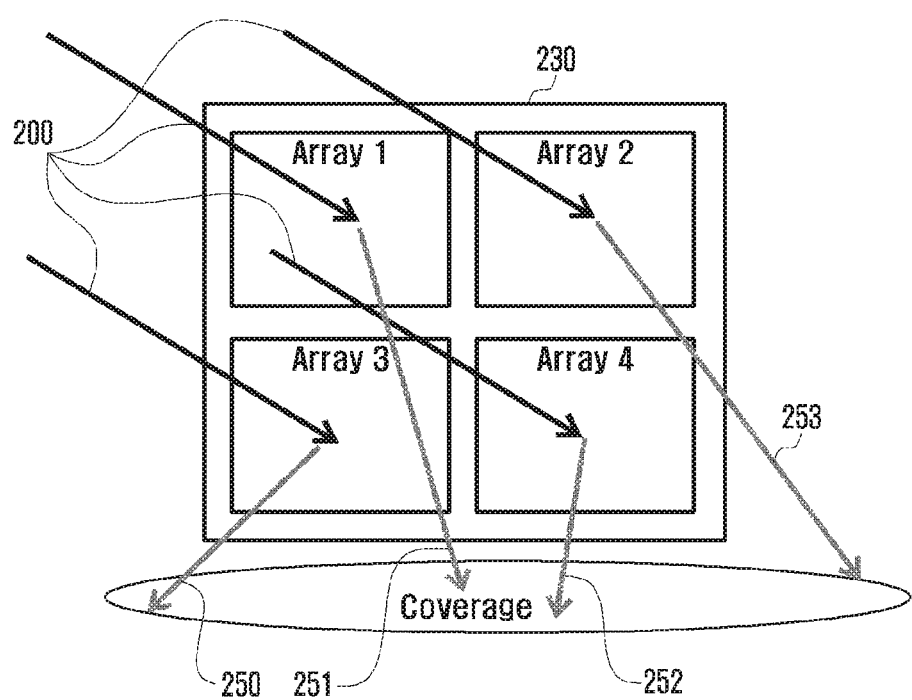

Referring to FIG. 2C, the reflector 230 may include a plurality of unit cell arrays capable of reflecting beams in different directions. Each of the unit cell arrays may include a plurality of unit cells. A dispersion angle of the 5G beam through each unit cell array may be varied by adjusting at least one of a processing type of a metal forming the plurality of unit cells, a size of the metal, or an interval of the plurality of unit cells arranged.

Specifically, each of the plurality of unit cell arrays may change the direction of a beam incident in the first direction to one of the second direction to the fifth direction. That is, the 5G beams 200 incident in the first direction may be dispersed to a beam 250 in the second direction, a beam 251 in the third direction, a beam 252 in the fourth direction, and a beam 253 in the fifth direction through the respective unit cell arrays. Thus, the transmission coverage of the 5G beams is widened.

Figure 2D:
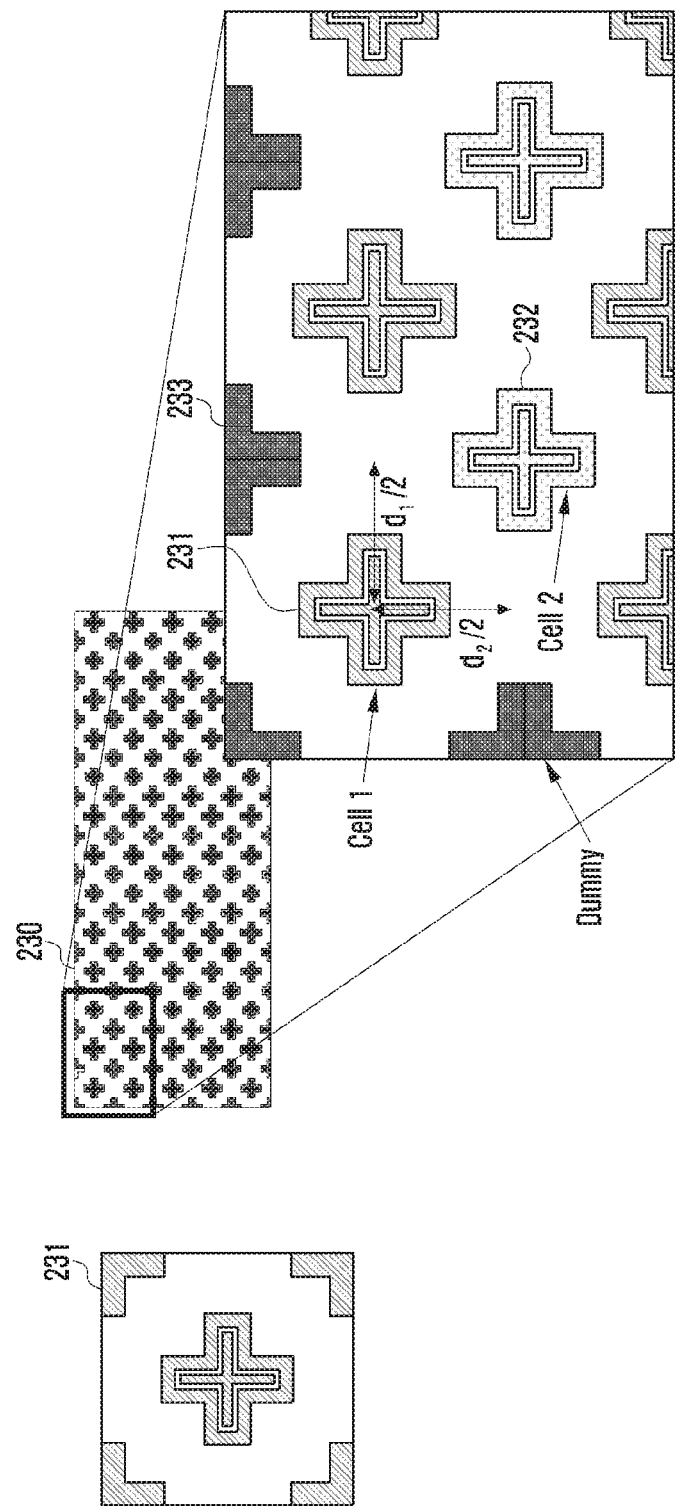

Referring to FIG. 2D shows the structure of a unit cell 231 and the structure of the reflector 230 formed of an array of the unit cells in an embodiment. Each of the unit cells 231 may be formed of a metal. The reflector 230 formed of the unit cell array may include a plurality of the unit cells 231. The unit cell array may include a first unit cell 231 and a second unit cell 232 that are capable of reflecting the 5G beams, incident in the first direction, to different directions. For example, the first unit cell 231 may reflect the 5G beam incident in the first direction to the second direction, and the second unit cell 232 may reflect the 5G beam incident in the first direction to the third direction. According to another embodiment, by arranging the first and second unit cells 231 and 232 alternately, the unit cell array may reflect the 5G beam incident in the first direction to the fourth direction. The unit cell array may further include a dummy unit cell 233.

Figure 9:
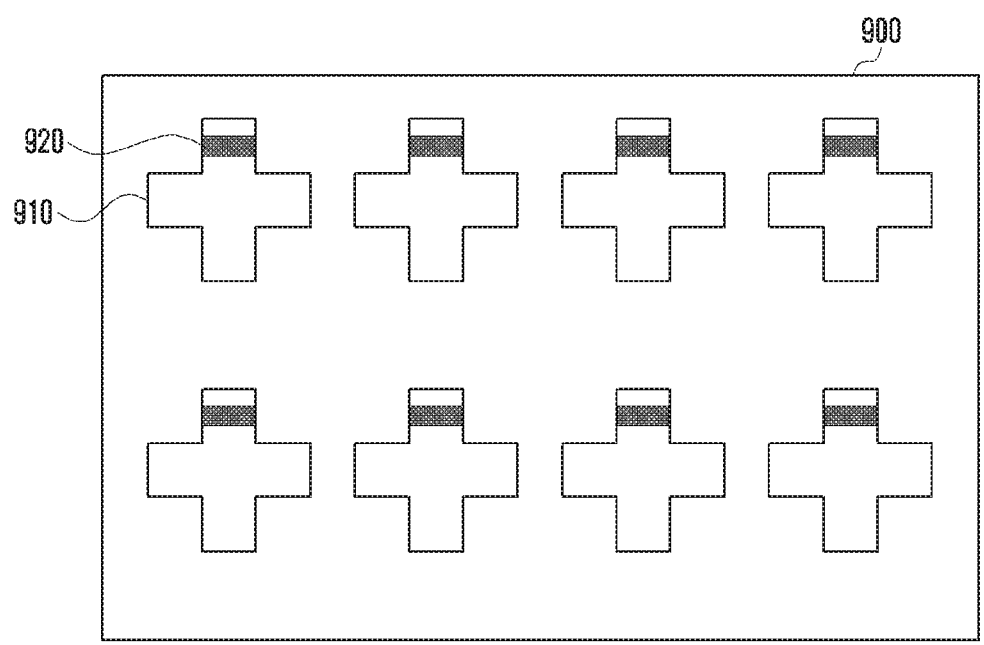
FIG. 9 is a diagram illustrating a reflector capable of changing a reflection angle thereof by controlling a structure of a unit cell according to an embodiment of the disclosure.

FIG. 9 is a diagram illustrating a reflector capable of changing a reflection angle thereof by controlling a structure of a unit cell according to an embodiment of the disclosure.

In addition, the unit cell included in the reflector may allow a change in a reflection angle thereof. This will be described in detail with reference to FIG. 9.

A unit cell 910 included in a reflector 900 may be formed of a variable element. Specifically, depending on the shape of the unit cell 910, the reflection angle of the reflector 900 may be changed. For example, when an adjuster 920 included in the unit cell 910 to change the shape of the unit cell 910 is not turned on, the unit cell 910 may reflect the 5G beam incident in the first direction to the second direction. On the other hand, when the adjuster 920 is turned on, a portion of the unit cell 910 may be inactivated by the adjuster 920. Therefore, the shape of the unit cell 910 is changed by the adjuster 920, so that the unit cell 910 may reflect the 5G beam incident in the first direction to the third direction.

A reflection apparatus including the reflector 900 may further include a communication unit and a controller. When a command to control the adjuster 920 of the reflector 900 is received through the communication unit, the controller may control the adjuster 920 to be turned on or off such that the shape of the unit cell 910 is changed.

Although FIG. 9 shows one adjuster 920 included in one unit cell 910, this is various only and not to be construed as a limitation. The number, position, shape, etc. of such adjusters for changing the shape of the unit cell 910 and thereby changing the reflection angle may be varied.

FIGS. 10A, 10B, 10C, 10D, 10E, 10F, 10G, 10H, and 10I are diagrams illustrating a reflector capable of changing a reflection angle thereof by controlling a shape thereof according to various embodiments of the disclosure.

In addition, by changing the shape of the reflector, the reflection angle of the reflector may be changed. Specifically, this will be described with reference to FIGS. 10A to 10I.

Figure 10A:
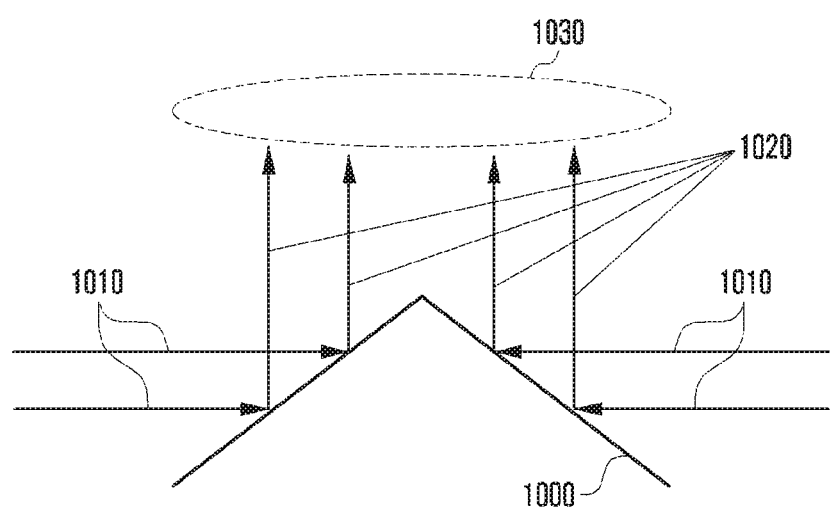
FIGS. 10A, 10B, 10C, 10D, 10E, 10F, 10G, 10H, and 10I are diagrams illustrating a reflector capable of changing a reflection angle thereof by controlling a shape thereof according to various embodiments of the disclosure.
Figure 10B:
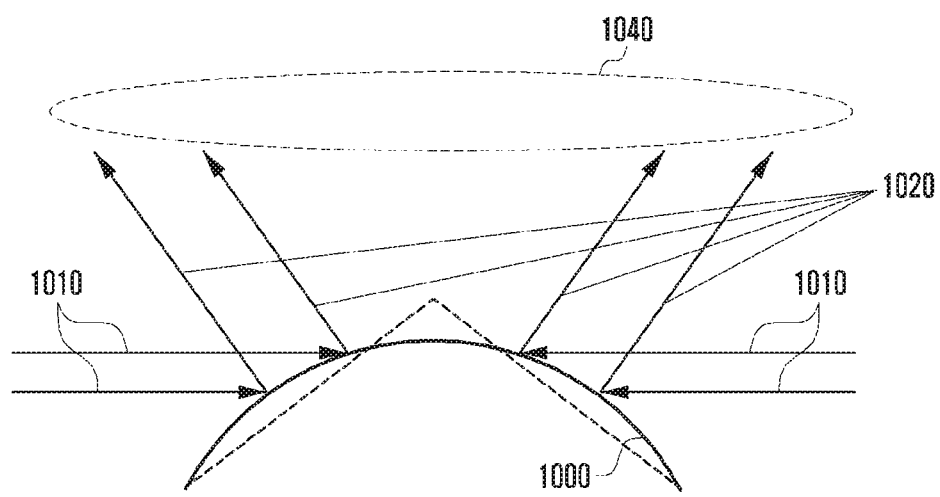

FIGS. 10A and 10B illustrate embodiments in which a reflector 1000 included in a reflection apparatus is capable of reflecting incident 5G beams 1010 to beams 1020 at a predetermined angle. That is, the reflector 1000 shown in FIGS. 10A and 10B may reflect the 5G beams 1010 incident at a first angle to the beams 1020 having a predetermined second angle. However, due to a difference in the shape of the reflector 1000, a coverage area 1040 by the reflector 1000 shown in FIG. 10B may be greater than a coverage area 1030 by the reflector 1000 shown in FIG. 10A.

Figure 10C:
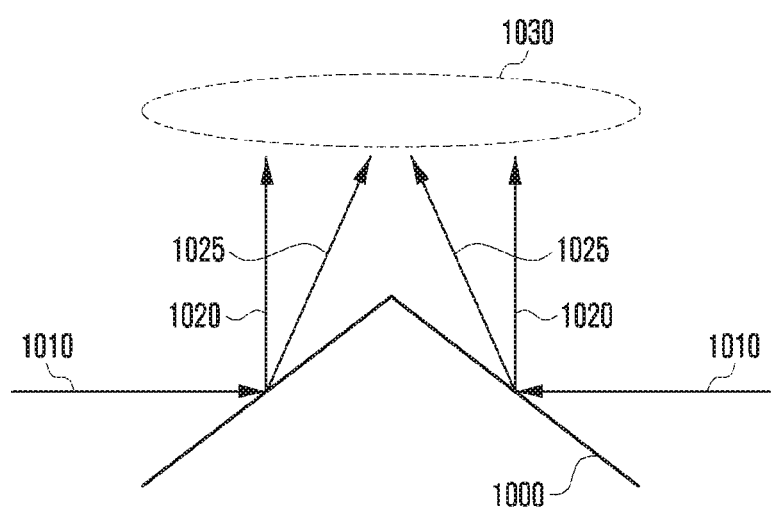
Figure 10D:
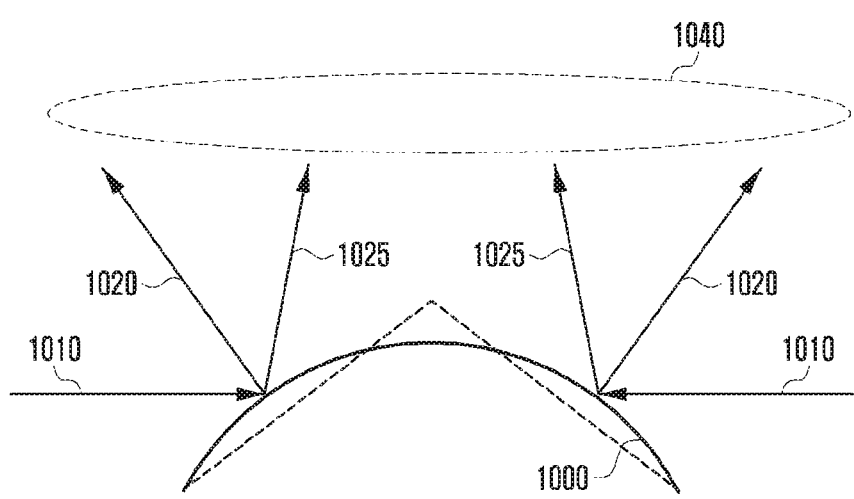

In addition, FIGS. 10C and 10D illustrate embodiments in which the reflector 1000 is capable of reflecting the incident 5G beams 1010 to beams 1020 and 1025 at predetermined two or more angles. That is, the reflector 1000 shown in FIGS. 10C and 10D may reflect the 5G beams 1010 incident at a first angle to the beam 1020 having a predetermined second angle and the beam 1025 having a predetermined third angle. However, because of a difference in the shape of the reflector 1000, a coverage area 1040 by the reflector 1000 shown in FIG. 10D may be greater than a coverage area 1030 by the reflector 1000 shown in FIG. 10C.

Meanwhile, depending on the location of the reflector 1000 or depending on the characteristics of a space where the reflector 1000 is installed (e.g., whether the 5G beam is incident on a wide space such as a square or a narrow space such as an alley or a corner), the coverage area should be changed by modifying the shape of the reflector 1000.

Also, depending on seasonal and climatic characteristics of a place where the reflector 1000 is installed, the coverage area may be changed by modifying the shape of the reflector 1000. For example, the shape of the reflector 1000 may be modified according to the density of trees or leaves in a space where the reflector 1000 is installed. Specifically, in the summer, as the density of leaves around the reflector 1000 increases, the shape of the reflector 1000 may be modified so as to reflect the beam to a wide coverage. On the other hand, in the winter, as the density of leaves decreases, the shape of the reflector 1000 may be modified so as to reflect the beam to a narrow coverage.

Figure 10E:
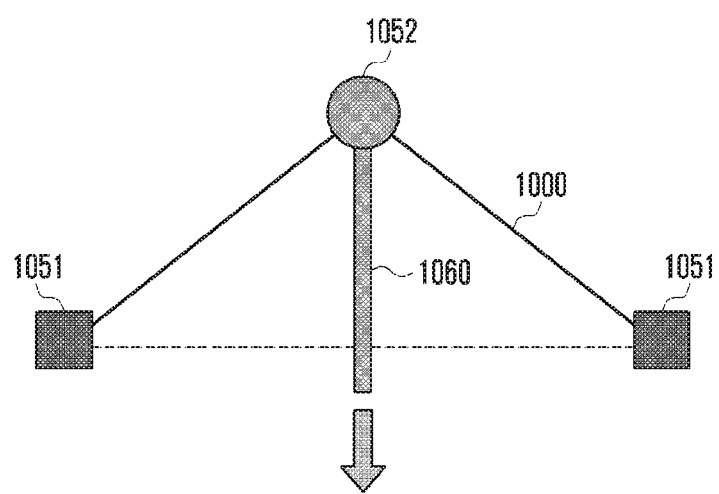

Therefore, the reflector 1000 may further include a variable member 1060 for modifying the shape of the reflector 1000. Specifically, as shown in FIG. 10E, the reflector 1000 may include a fixed point 1051 and a variable point 1052. The fixed point 1051 of the reflector 1000 may be fixed at a certain position where the reflector 1000 is installed. The variable member 1060 may be attached to the variable point 1052. The fixed point 1051 and the variable point 1052 may be virtual points that indicate portions of the reflector 1000 for convenience of explanation.

Figure 10F:
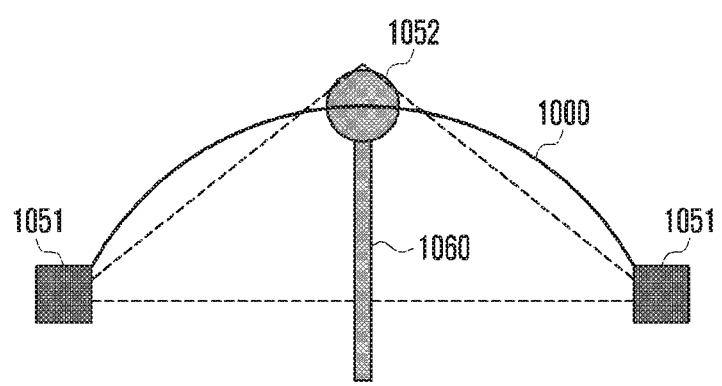

When there is a need to reflect the 5G beam to a narrow coverage, the variable member 1060 may fix the reflector 1000 in a form as shown in FIG. 10E. On the other hand, when there is a need to reflect the 5G beam to a wider coverage, the shape of the reflector 1000 may be modified by adjusting the variable member 1060 in another form as shown in FIG. 10F.

Figure 10G:
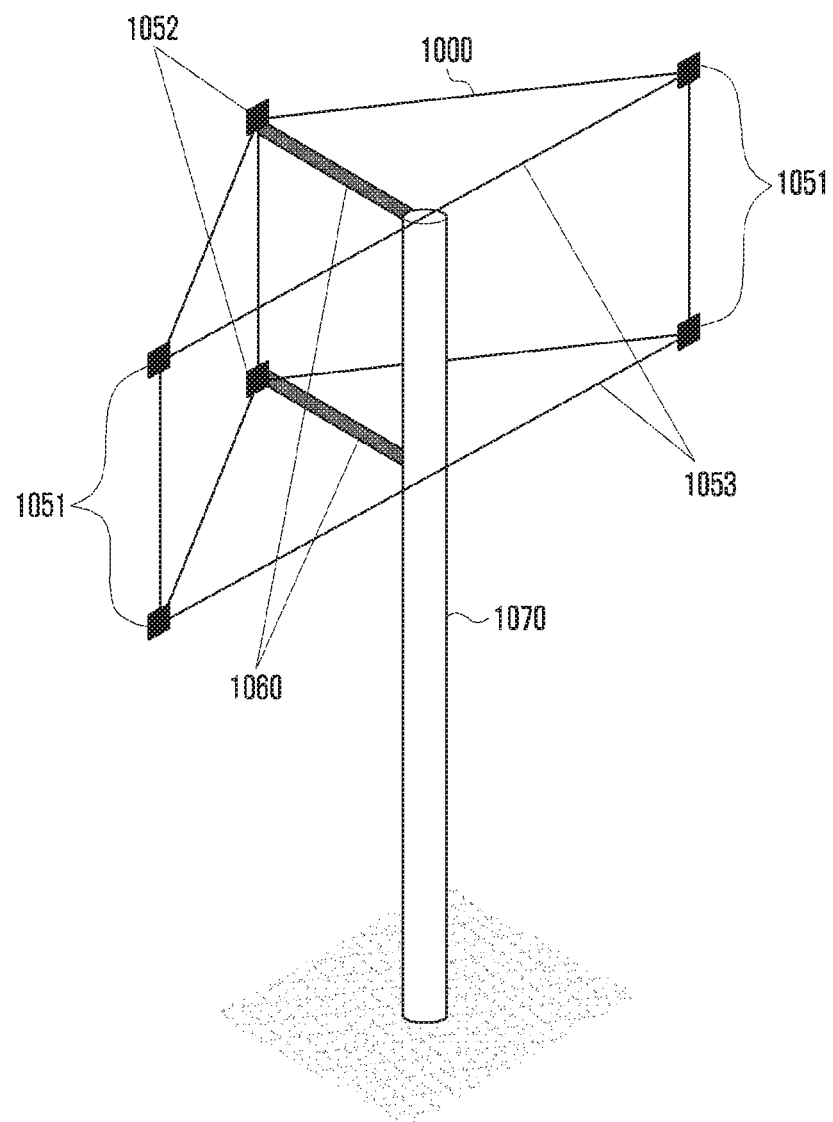

In addition, the reflector 1000 may be installed on a support 1070 in a form as shown in FIG. 10G.

Although FIG. 10G shows that the reflector 1000 is attached to two variable members 1060 at two variable points 1052, this is various only. The number of the variable members 1060 is not limited.

In addition, as shown in FIG. 10G, the fixed points 1051 of the reflector 1000 may be connected to the support 1070 such that the reflector 1000 is fixed to the support 1070. In this case, a connector 1053 may be used for connecting the support 1070 to the fixed points 1051 located at respective corners of the reflector 1000. The connector 1053 may be formed of at least one rod. Alternatively, the connector 1053 may be implemented as a planar form for connecting all of the fixed points 1051 located at the respective corners.

The shape of the reflector 1000 may be modified to a desired shape as shown in FIG. 10E or 10F by adjusting a position where the variable member 1060 is fixed to the support 1070. For example, if the length of the variable member 1060 fixed to the support 1070 is shortened, the shape of the reflector 1000 may approach the shape shown in FIG. 10F.

Figure 10H:
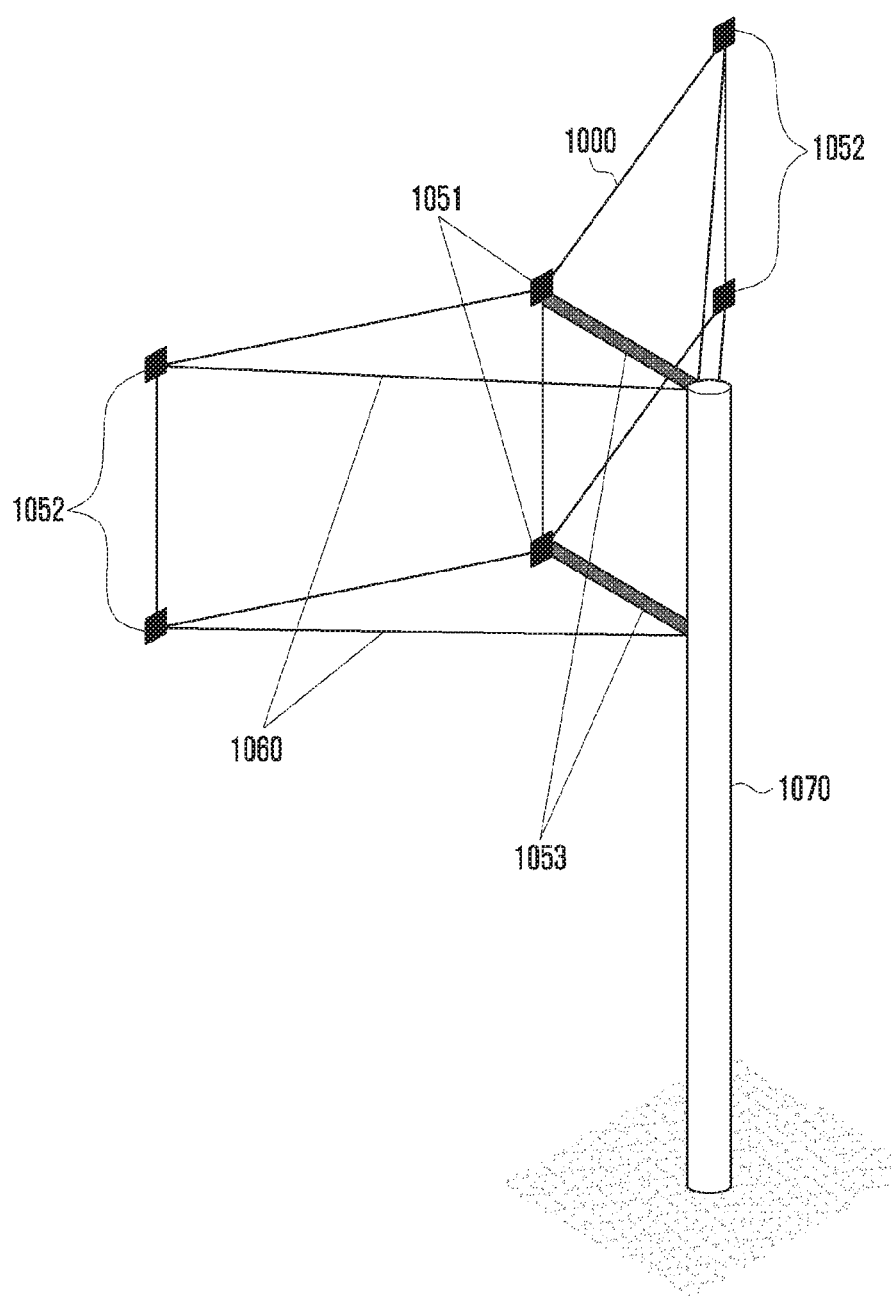
Figure 10I:
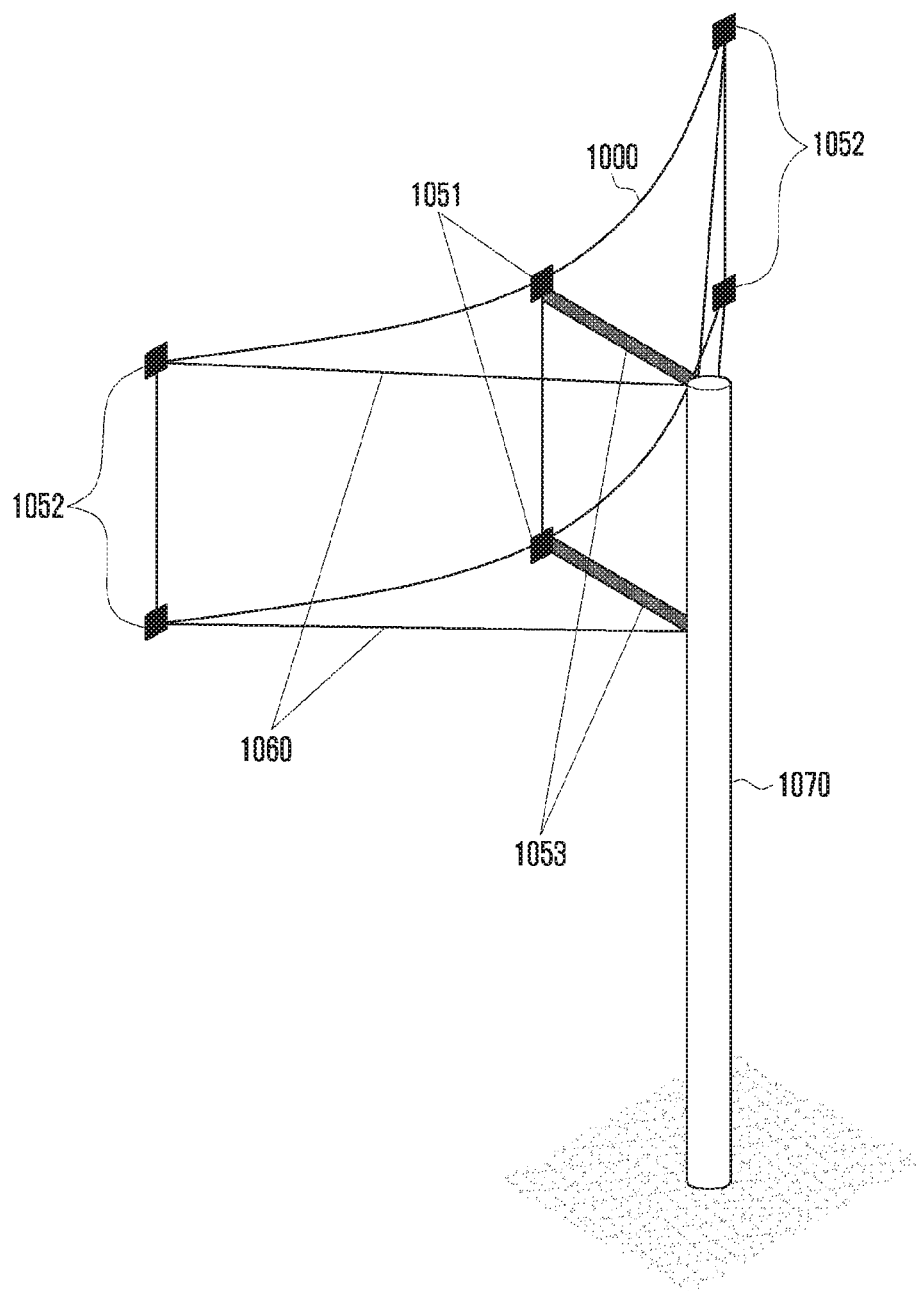

On the other hand, relative positions of the fixed point 1051 and the variable point 1052 may be varied. For example, as shown in FIGS. 10H and 10I, the center of the reflector 1000 may become the fixed point 1051 and be connected to the support 1070. Also, the variable points 1052 may be located at respective corners of the reflector 1000. Thus, in this embodiment shown in FIGS. 10H and 10I, the shape of the reflector 1000 may be modified in the opposite direction to that of FIG. 10G. Also, in this embodiment shown in FIGS. 10H and 10I, the variable member 1060 may be connected to the variable point 1052 located at each corner of the reflector 1000. In this embodiment, the reflector 1000 and the support 1070 may be connected to each other through the connector 1053 having an unchanged length and shape and/or the variable member 1060 having a changeable length for modifying the shape of the reflector 1000.

The reflector 1000 may include a communication unit, a driver, and a controller. That is, when a control signal for controlling the driver equipped in the reflector 1000 is received through the communication unit, the controller may control the driver to adjust the length of at least one of the variable member 1060 or the connector 1053.

The control signal may be received at regular time intervals, depending on the characteristics of a region or space where the reflection apparatus is installed, the seasonal characteristics, and the like. In addition, the control signal may be received by a user input.

Figure 2E:
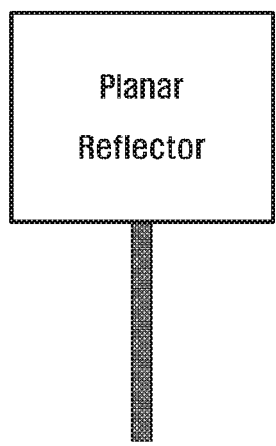
Figure 2E:
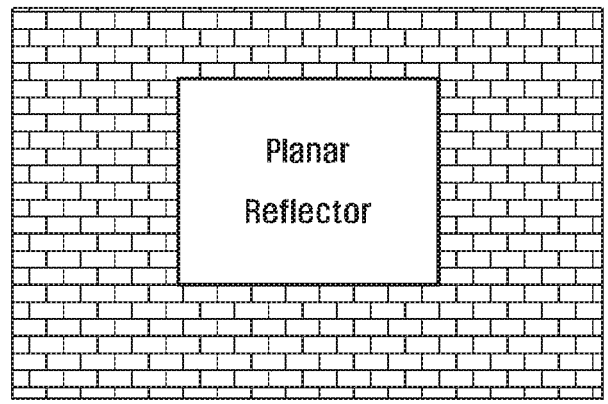

Meanwhile, as shown in FIG. 2E, the reflector 230 may be installed in the form of a pole by using the support, or may be installed in a form attached to a wall.

Figure 2F:
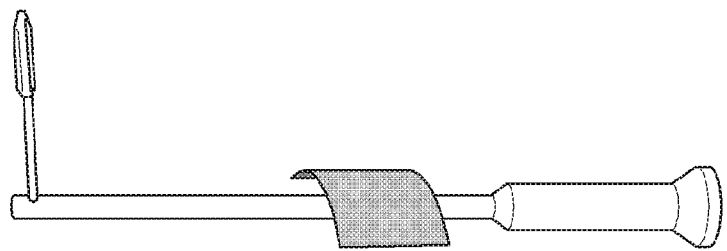
Figure 2F:
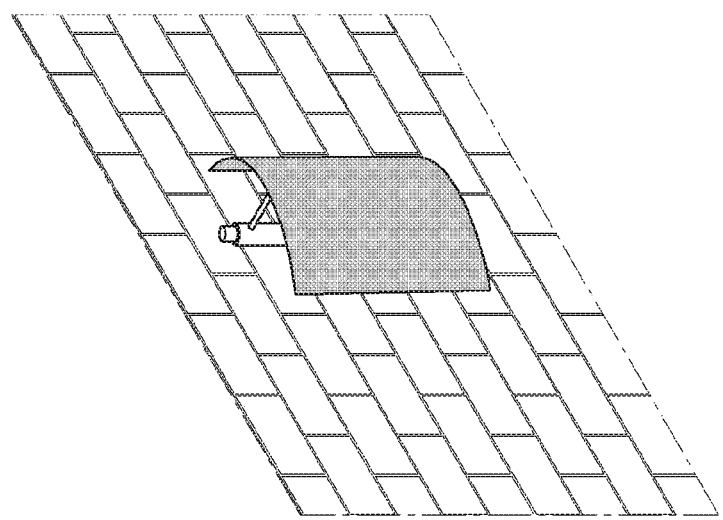
Figure 2F:
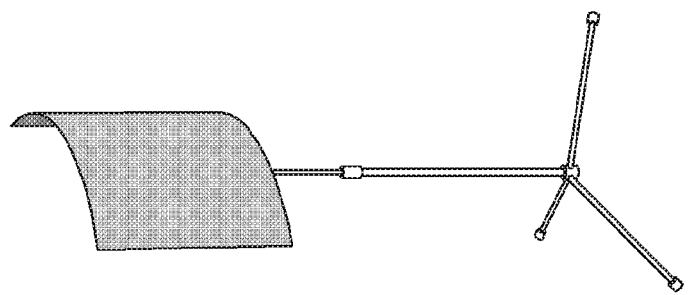

FIG. 2F shows various installation types of the reflector. As shown in FIG. 2F, the reflector may be implemented as a stand type or a wall-mounted type and may be installed at a desired position. Additionally or alternatively, the reflector may be installed on an existing structure such as a streetlight. This is merely one example, and the reflector may be installed on various structures such as a tree, a fire hydrant, and a billboard.

The reflector, which is installed in various forms as described above, may control the shadow area caused by objects such as a pole.

Figure 11A:
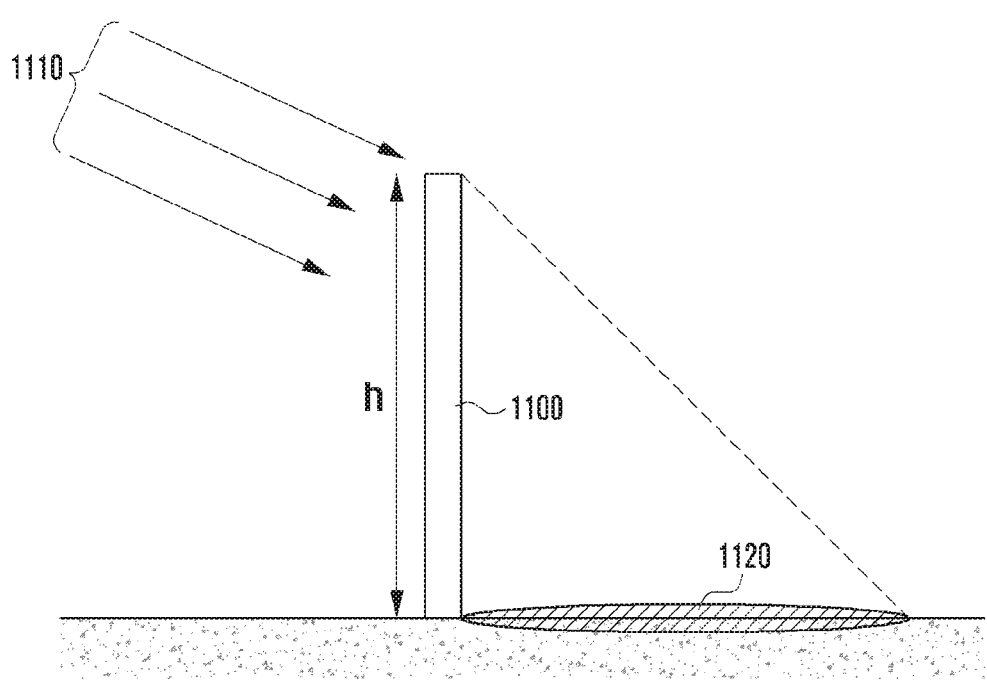
FIGS. 11A and 11B are diagrams illustrating the effect of installing a reflector according to various embodiments of the disclosure.
Figure 11B:
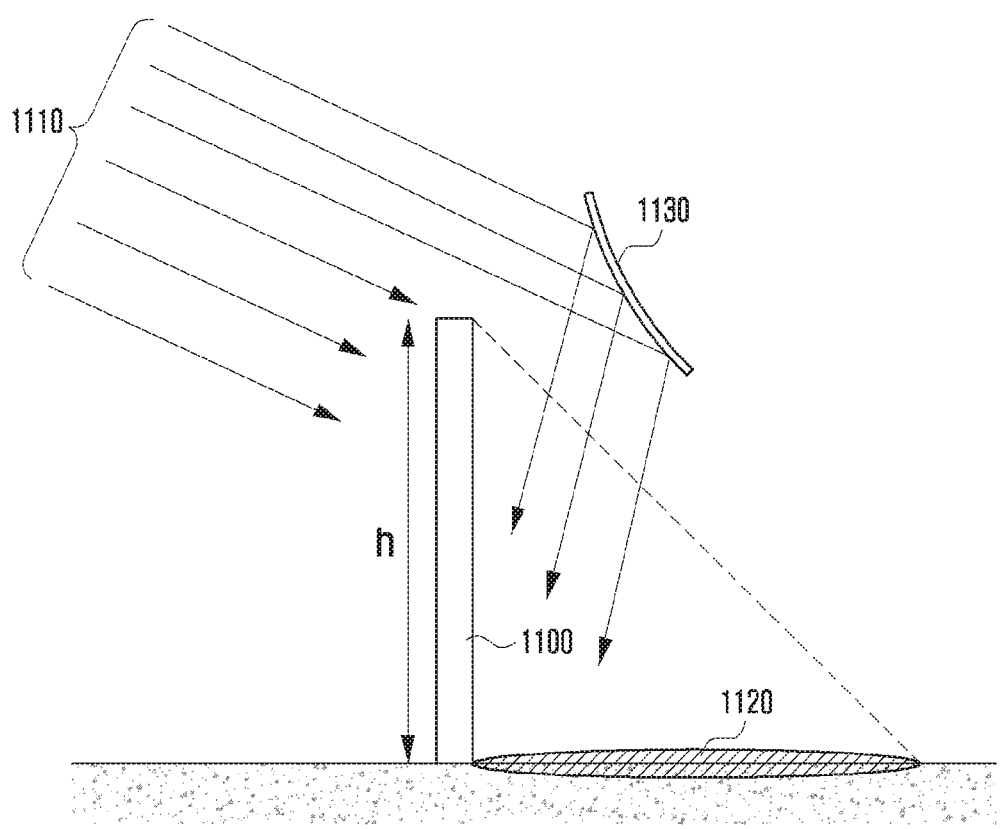

FIGS. 11A and 11B are diagrams illustrating the effect of installing a reflector according to various embodiments of the disclosure.

Referring to FIG. 11A, when there is a pole 1100 having the height of h in a transmission direction of 5G beams 1110, a shadow area 1120 may be produced by the pole 1100 on the opposite side of a source of the 5G beams 1110.

In this case, if a reflection apparatus 1130 is installed as shown in FIG. 11B, the 5G beams 1110 may be transmitted into the shadow area 1120 as well. As described above, the reflection apparatus 1130 may be installed in the form of a pole by using a support or attached to a part of a building, a wall, or the like.

FIGS. 3A, 3B, 3C, and 3D are diagrams illustrating a reflection apparatus for changing the direction of a beam passing through a window according to various embodiments of the disclosure.

Referring to FIGS. 3A to 3D are diagrams illustrating another embodiment of removing a shadow area for a 5G beam by a reflection apparatus that changes the direction of a beam passing through a window.

Figure 3A:
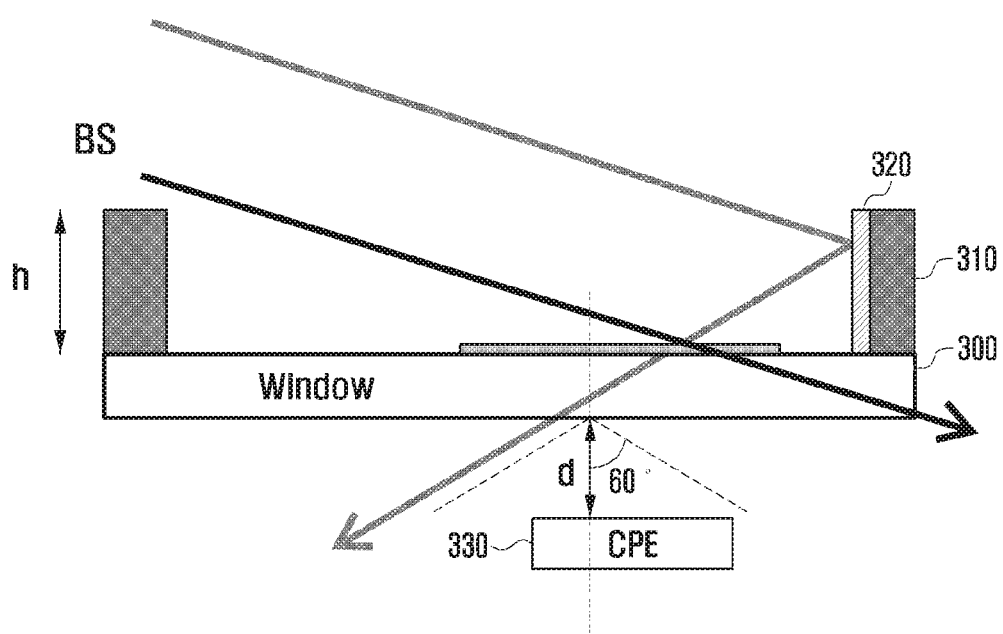
FIGS. 3A, 3B, 3C, and 3D are diagrams illustrating a reflection apparatus for changing the direction of a beam passing through a window according to various embodiments of the disclosure.

Specifically, FIG. 3A shows that a window 300 and a window frame or a wall surface 310, on which the window frame is installed, are formed on an outer wall of a building and that a CPE 330 is installed fixedly inside the building. Normally, a 5G base station (BS) transmits a 5G signal from outside the building, and the CPE 330 may be disposed in the building to receive the 5G signal and transform it into a wireless communication signal such as Wi-Fi. The 5G signal may penetrate obliquely the window 300 and then arrive at the CPE 330, which is separated from the window by a certain distance (d).

When the window 300 is made of glass and an incident angle of the 5G beam with respect to the window 300 is great, the 5G beams may be mostly reflected by the glass.

Figure 3B:
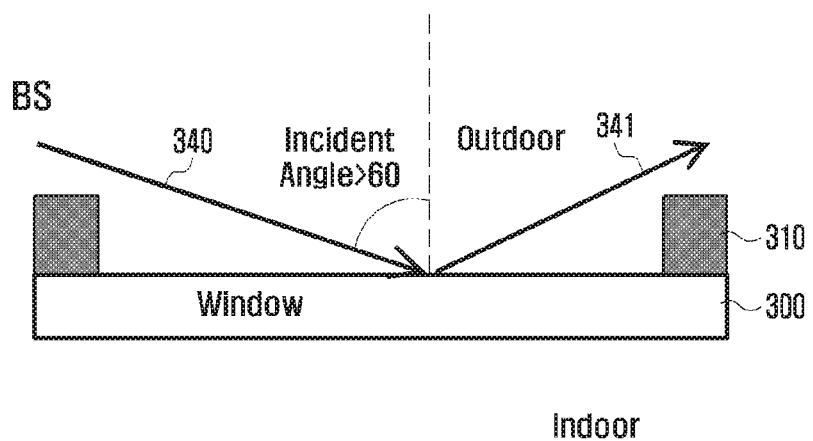

Referring to FIG. 3B, assuming that a virtual line perpendicular to the window 300 indicates 0 degree, the 5G beam incident at an incident angle exceeding 60 degrees as indicated by a reference numeral 340 may be reflected with high reflectance as indicated by a reference numeral 341.

According to the disclosure, a reflection apparatus 320 may be attached to the window frame or the wall surface 310, on which the window frame is installed, in order to change the direction of the 5G beam. Therefore, the 5G beam incident in a first direction changes the direction thereof to a second direction by the reflection apparatus 320, so that the CPE 330 located apart from the window 300 may receive the 5G beam. That is, the reflection apparatus 320 allows the CPE 330, which is located on the opposite side of the base station transmitting the beam with respect to the window 300, to receive the beam.

Figure 3C:
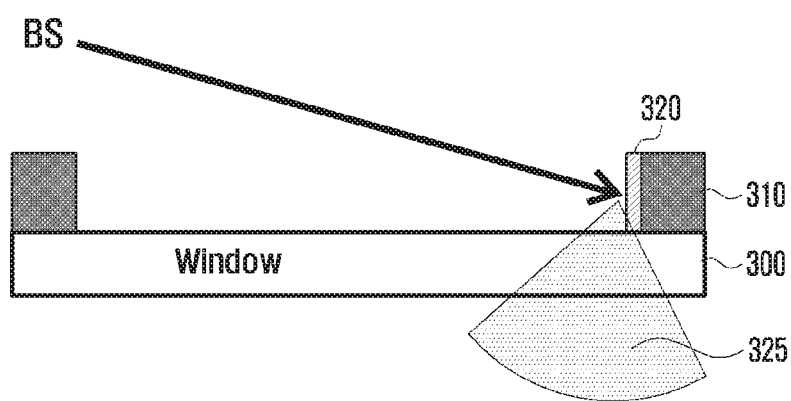

Referring to FIG. 3C, the reflection apparatus 320 may reflect the 5G beam incident in the first direction to a plurality of directions. Specifically, when the reflection apparatus 320 has a unit cell array structure as earlier described with reference to FIGS. 2A to 2E, or when the reflection apparatus 320 is formed of a curved surface, the reflection apparatus 320 may allow the 5G beam to be reflected in a plurality of directions. By the reflection apparatus 320, the reception coverage 325 of the 5G beam incident at a certain angle may be widened.

Figure 3D:
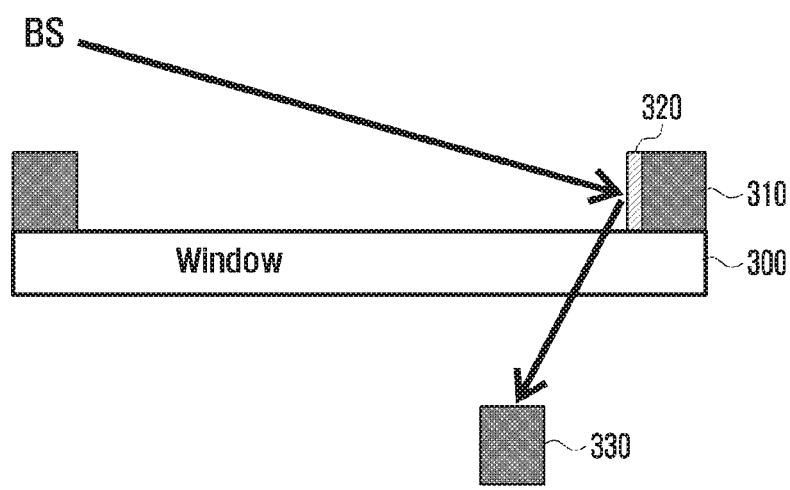

Referring to FIG. 3D, the 5G beam may be transmitted through the reflection apparatus 320 to a receiving entity such as the CPE 330 located at a certain position inside the building.

The reflection apparatus 320 may further include a fixing member. The fixing member may fix the reflection apparatus 320 to a certain position such as the window frame or the wall surface 310 on which the window frame is installed. For example, the reflection apparatus 320 may have a reflective member on one surface thereof and the fixing member on the other surface.

The reflective member may be interchangeably used with the above-described reflector, and the fixing member may be interchangeably used with the above-described support, a fastening member, or any member capable of installing, mounting, or attaching the reflective member of the reflection apparatus 320 to the ground, a part of a building, or the like.

Figure 4A:
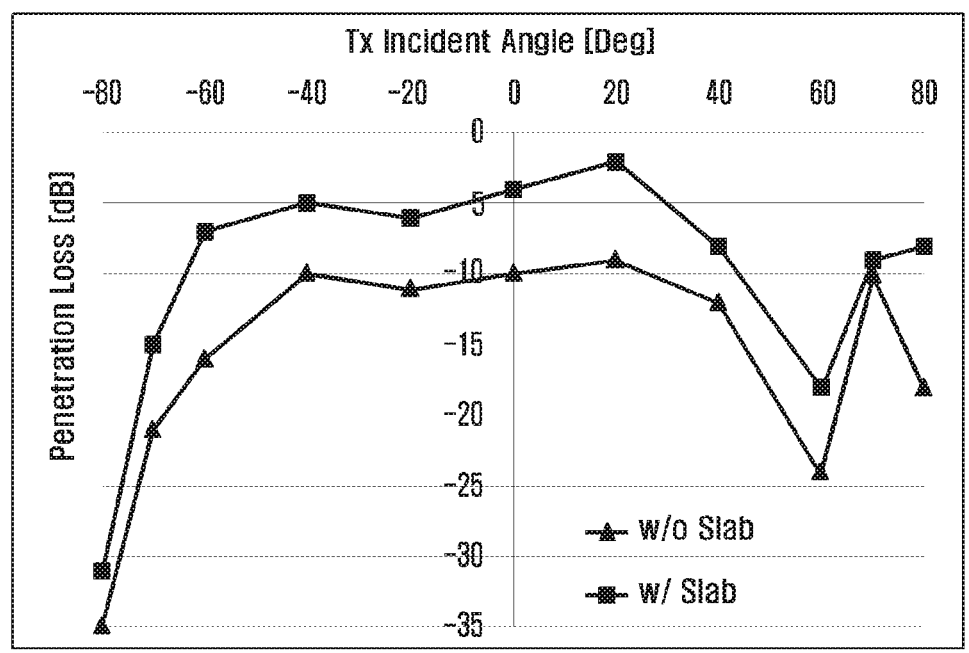
FIGS. 4A and 4B are graphs showing a penetration loss according to an incident angle of a beam passing through a glass window according to various embodiments of the disclosure.
Figure 4B:
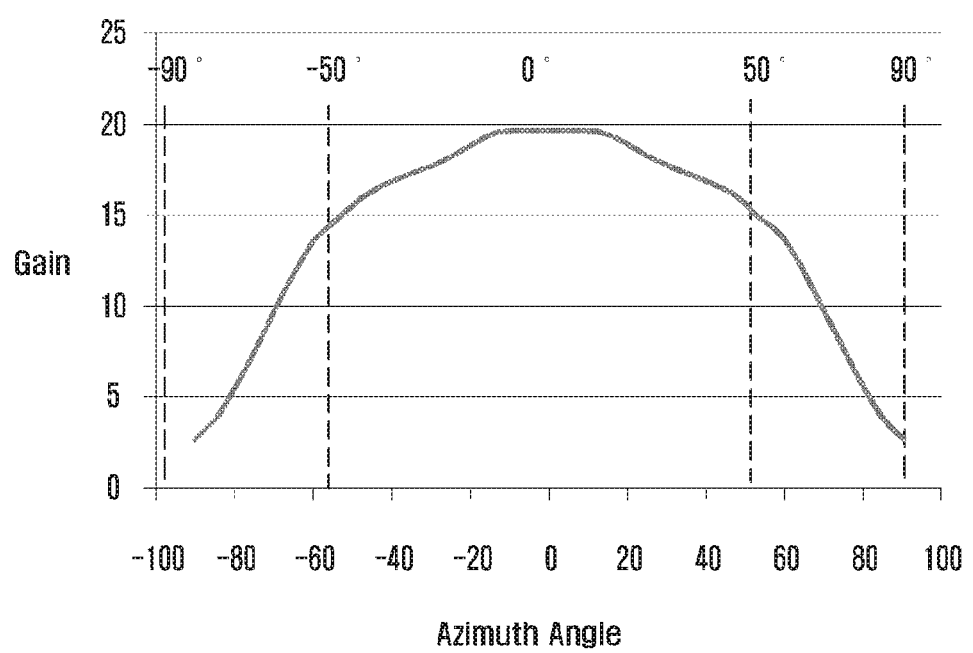

FIGS. 4A and 4B are graphs showing a penetration loss according to an incident angle of a beam passing through a glass window according to various embodiments of the disclosure.

Referring to FIGS. 4A and 4B are graphs showing a penetration loss according to an incident angle of a beam passing through a glass window.

Assuming that a virtual line perpendicular to the glass window 300 toward the CPE 330 indicates 0 degree, it can be seen, as shown in FIG. 4A, that the penetration loss of the 5G beam increases sharply when an absolute value of the incident angle of the 5G beam exceeds 60 degrees.

In addition, as shown in FIG. 4B, when an absolute value of the incident angle of the 5G beam exceeds 60 degrees, the antenna loss of a terminal also increases rapidly (namely, the antenna gain decreases).

FIGS. 5A, 5B, 5C, 5D, and 5E are diagrams illustrating a reflection apparatus attached to a window frame or a wall surface, on which the window frame is installed, according to various embodiments of the disclosure. In these embodiments, the reflection apparatus may refer to all kinds of devices including the above-described reflective member or reflector and the above-described fixing member or support.

Figure 5A:
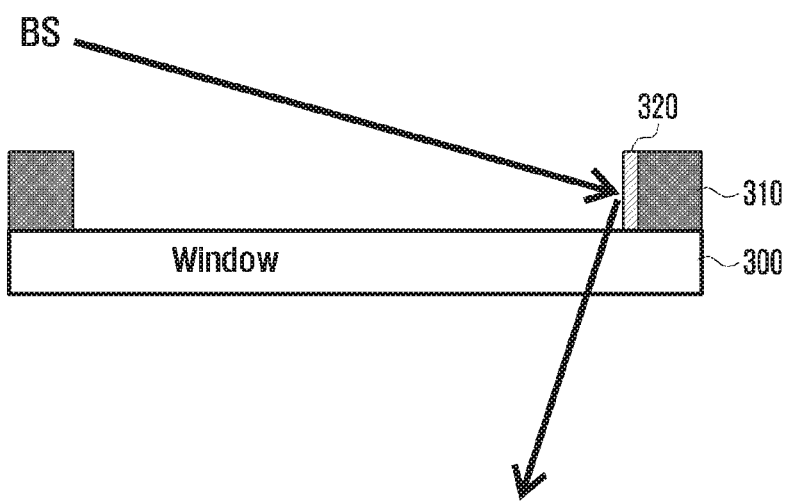
FIGS. 5A, 5B, 5C, 5D, and 5E are diagrams illustrating a reflection apparatus attached to a window frame according to various embodiments of the disclosure.

First, FIG. 5A shows a reflection apparatus 320 attached to a window frame of a window 300 or to a wall surface 310 on which the window frame is installed.

Figure 5B:
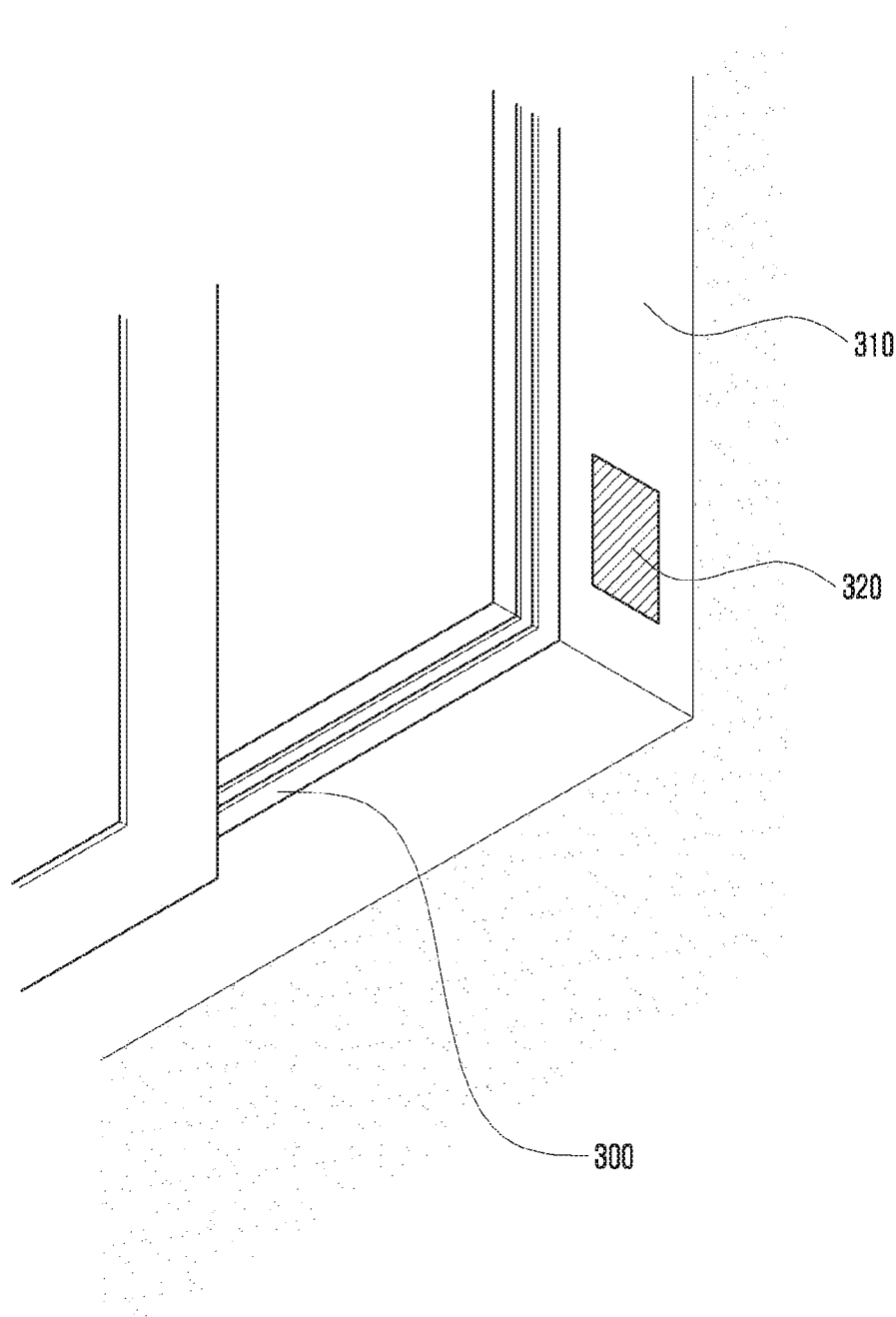

Specifically, FIG. 5B shows the reflection apparatus 320 of a planar shape attached to the window frame of the window 300 or to the wall surface 310 on which the window frame is installed. The reflection apparatus 320 may change the direction of a beam incident in the first direction such that the beam penetrates the window 300 in the second direction. For example, when the beam is incident on the window 300 at a first angle of 60 degrees or more with respect to a direction perpendicular to the window 300, the reflection apparatus 320 may change the direction of the beam such that the beam can pass through the window 300 within a second angle smaller than the first angle.

Therefore, a receiving entity such as the above-described CPE 330 fixedly disposed inside a building can receive the 5G beam by the reflection apparatus 320.

Figure 5C:
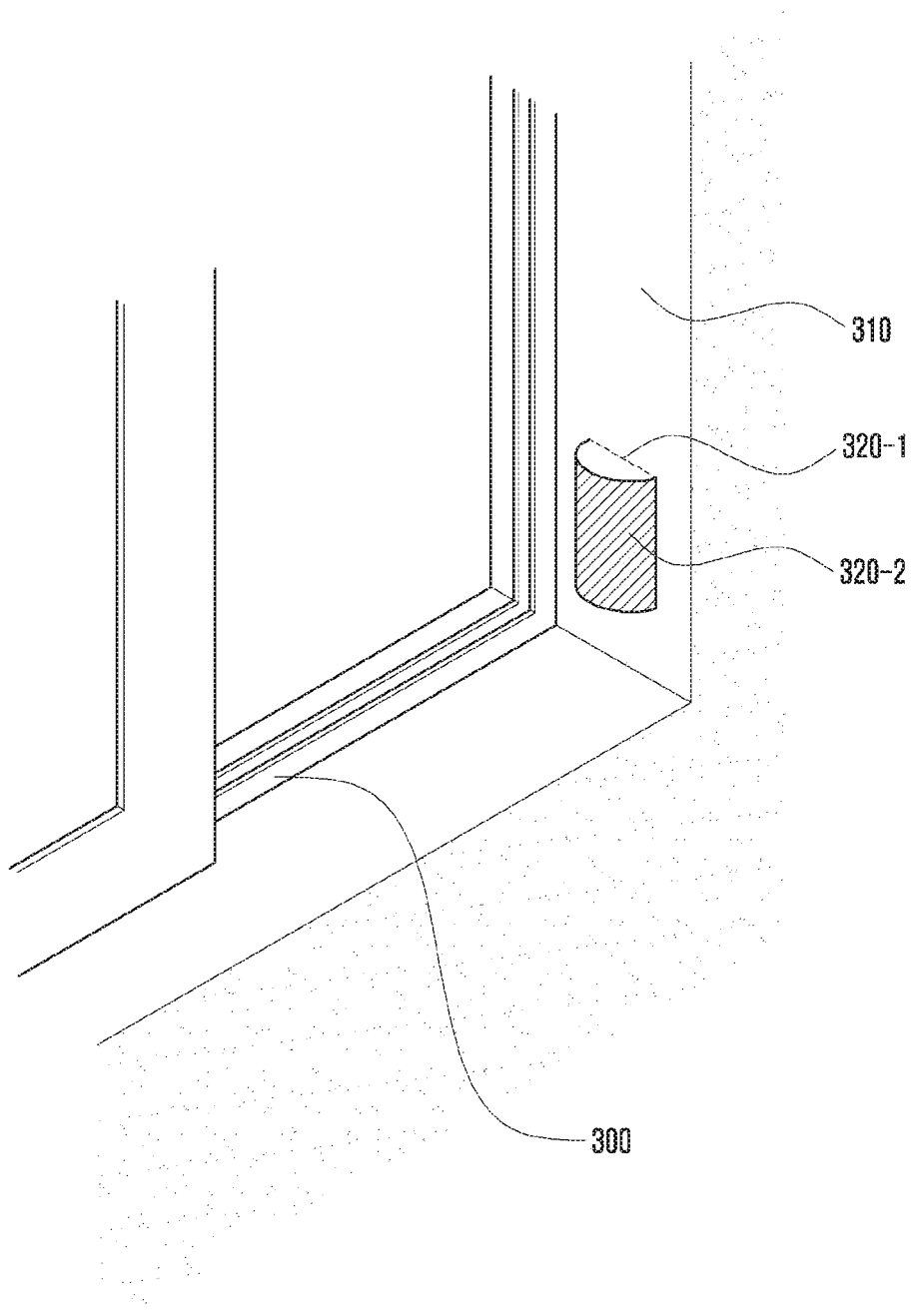

In addition, FIG. 5C shows another embodiment in which the reflection apparatus includes the fixing member and the reflector protruding in a direction opposite to the fixing member. Specifically, as shown in FIG. 5C, the fixing member 320-1 of the reflection apparatus may have a planar surface attached to the window frame or the wall surface 310 on which the window frame is installed.

The reflector 320-2 protruding in the direction opposite to the fixing member may change the 5G beams incident in the first direction to beams having a plurality of directions. For example, the reflector 320-2 may be formed at least partially of a curved surface. Therefore, when the 5G beams are incident on the curved surface of the reflector 320-2 in the first direction, the reflector 320-2 may disperse the incident beams into beams having a plurality of directions.

Although FIG. 5C shows the reflection apparatus having a semi-cylindrical form, the reflection apparatus may be also implemented as a cylindrical form, a conical form, or any other form. Further, the reflection apparatus may have an empty inner space or be filled with a metallic material.

Depending on the size of the reflector 320-2, the directions in which the 5G beams are dispersed may be varied. Therefore, the size of the reflector 320-2 may be varied depending on the size of the window to which the reflection apparatus is attached, the position of the CPE 330 installed inside the building, and the like. For example, the size of the reflector 320-2 may be determined in consideration of the position of the CPE 330 so that the 5G beam can be incident through the window.

Figure 5D:
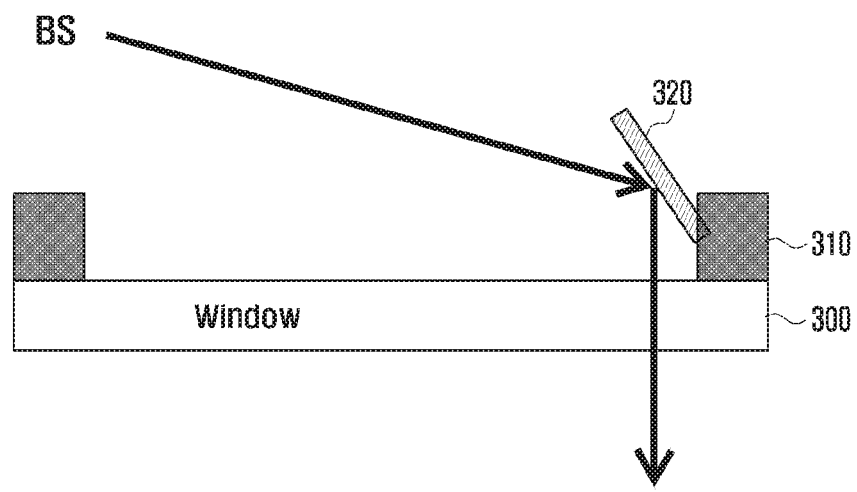
Figure 5E:
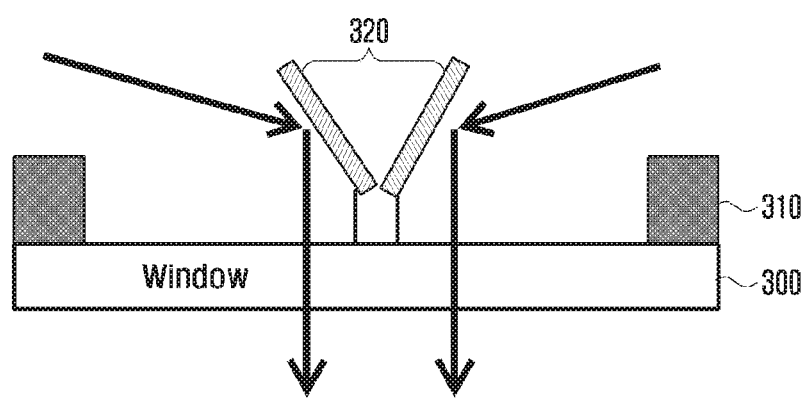

In addition, FIG. 5D shows still another embodiment in which the reflector 320 is installed on and protruded from the window frame. Also, FIG. 5E shows yet another embodiment in which the reflector 320 is installed on the window 300. This embodiment of FIG. 5E will be described in detail later.

FIGS. 6A, 6B, 6C, and 6D are diagrams illustrating a possible shape and resultant effect of a reflection apparatus according to various embodiments of the disclosure.

Figure 6A:
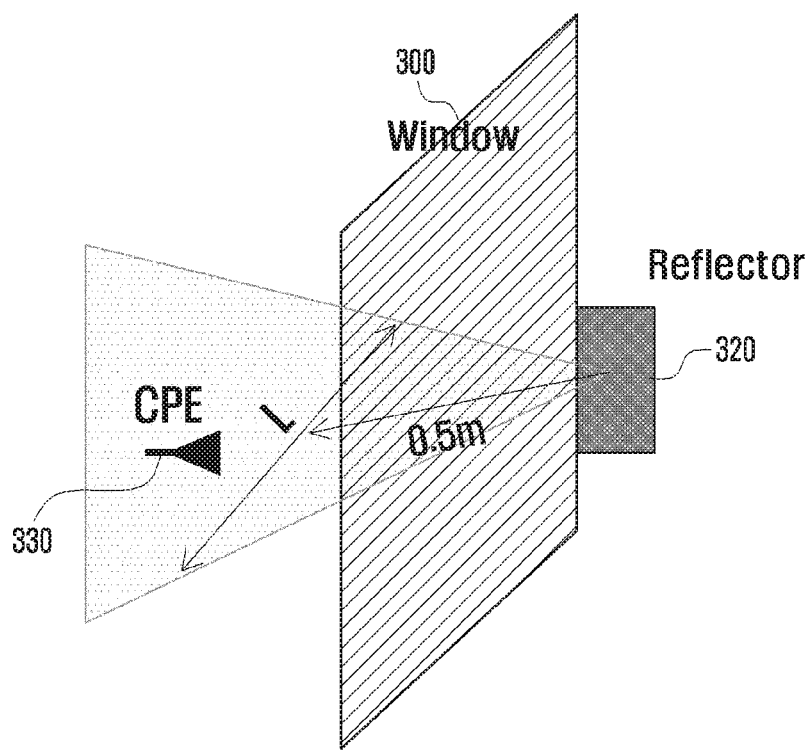

Referring to FIG. 6A, when the CPE 330 and the reflection apparatus 320 are installed at intervals of 0.5 meters inside and outside the window 300, respectively, the reflection apparatus 320 may change the direction of the incident 5G beam to pass through the window 300 and then reach the coverage having a length of L.

Figure 6B:
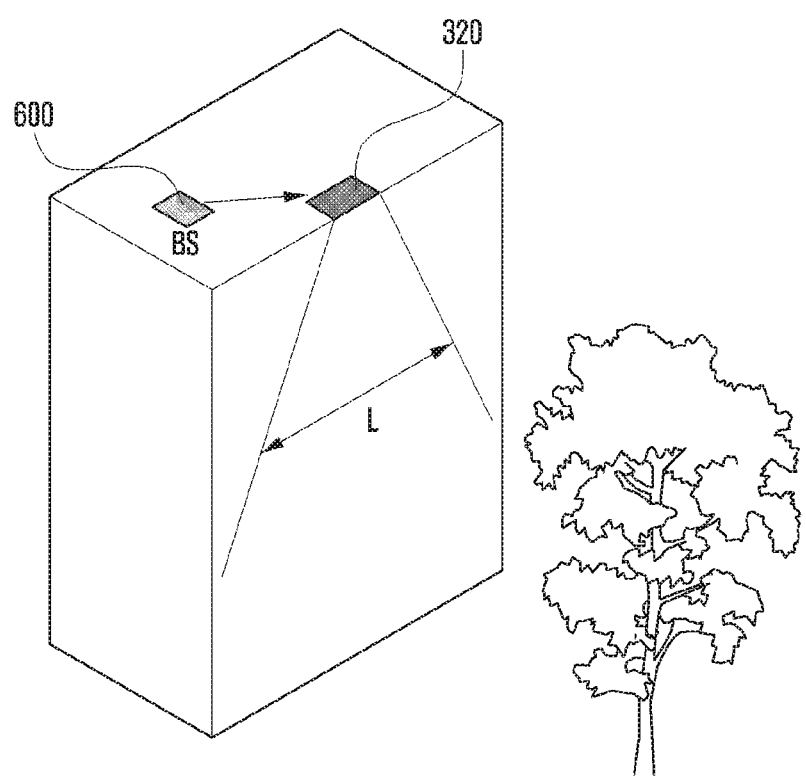

Referring to FIG. 6B shows a case where the reflection apparatus 320 is installed in the same building as a base station 600. In this case, the reflection apparatus 320 may change the direction of the 5G beam transmitted to the base station 600. Therefore, through the reflection apparatus 320, the 5G beam may be transmitted without any shadow area inside or outside the building.

Figure 6C:
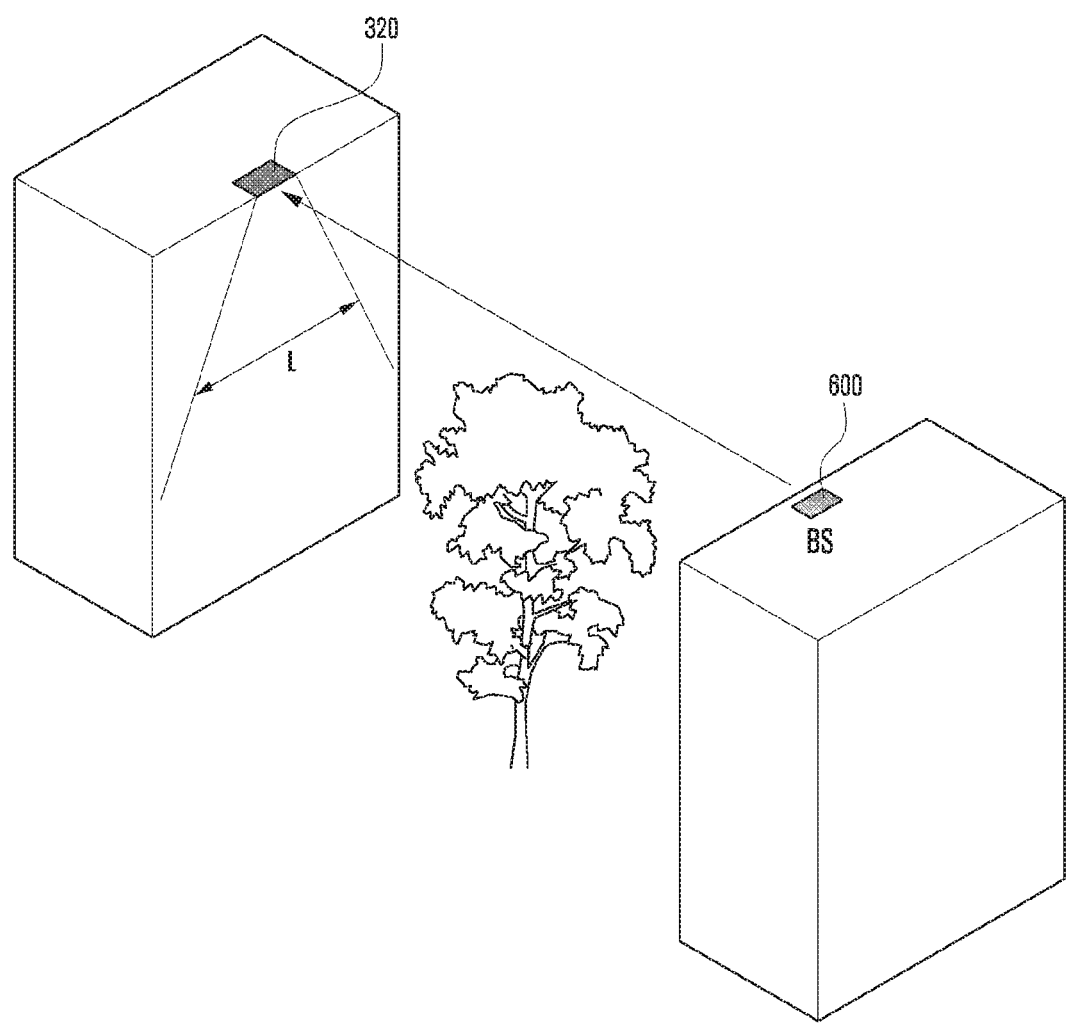

Referring to FIG. 6C shows a case where the reflection apparatus 320 is installed in a building other than the base station 600. Even if there is an object such as a tree between buildings where the reflection apparatus 320 and the base station 600 are installed as shown in FIG. 6C, the reflection apparatus 320 may remove any shadow area that may be caused by the object.

Referring to FIG. 6D shows examples of coverage and loss according to the shape of the reflection apparatus 320 as described in FIGS. 6A to 6C. As shown in FIG. 6D, even if having similar sizes, the reflection apparatus including the reflector of a conical form may have a wider coverage (L) than the reflection apparatus including the reflector of a planar form. Further, even if having the same conical form, the reflector having a greater angle of a sector may have a wider coverage (L).

Having a wide coverage means that the 5G beam incident in the first direction can pass through the window in the second direction ranging widely. However, as the coverage increases, the loss of the 5G beam may increase.

Therefore, considering the size of the coverage and the loss of the 5G beam according to the use of the building, the size of the window, the installation location of the base station 600, the distance between the reflection apparatus 320 and the base station 600, the installation location of the CPE 330, and the like, various forms of reflection apparatus may be selectively installed.

Figure 7:
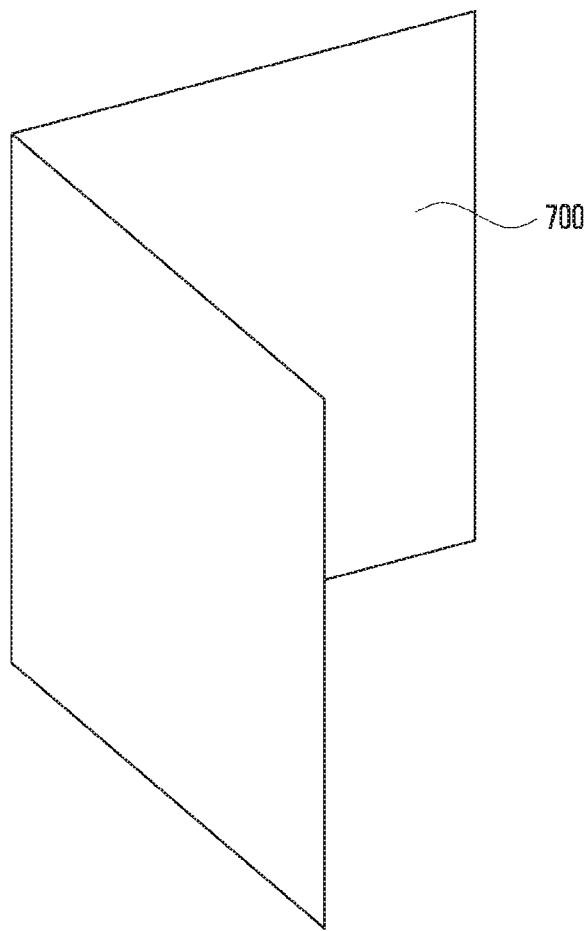
FIG. 7 is a diagram illustrating a reflection apparatus implemented in a V shape according to an embodiment of the disclosure.

FIG. 7 is a diagram illustrating a reflection apparatus implemented in a V shape according to another embodiment of the disclosure. The V-shaped reflection apparatus 700 shown in FIG. 7 may be formed of two reflectors adjoined to each other at one edge thereof, or formed of a single reflector bent to form a V shape. The V-shaped reflection apparatus 700 may be implemented as being transparent and then attached to a window.

Figure 8A:
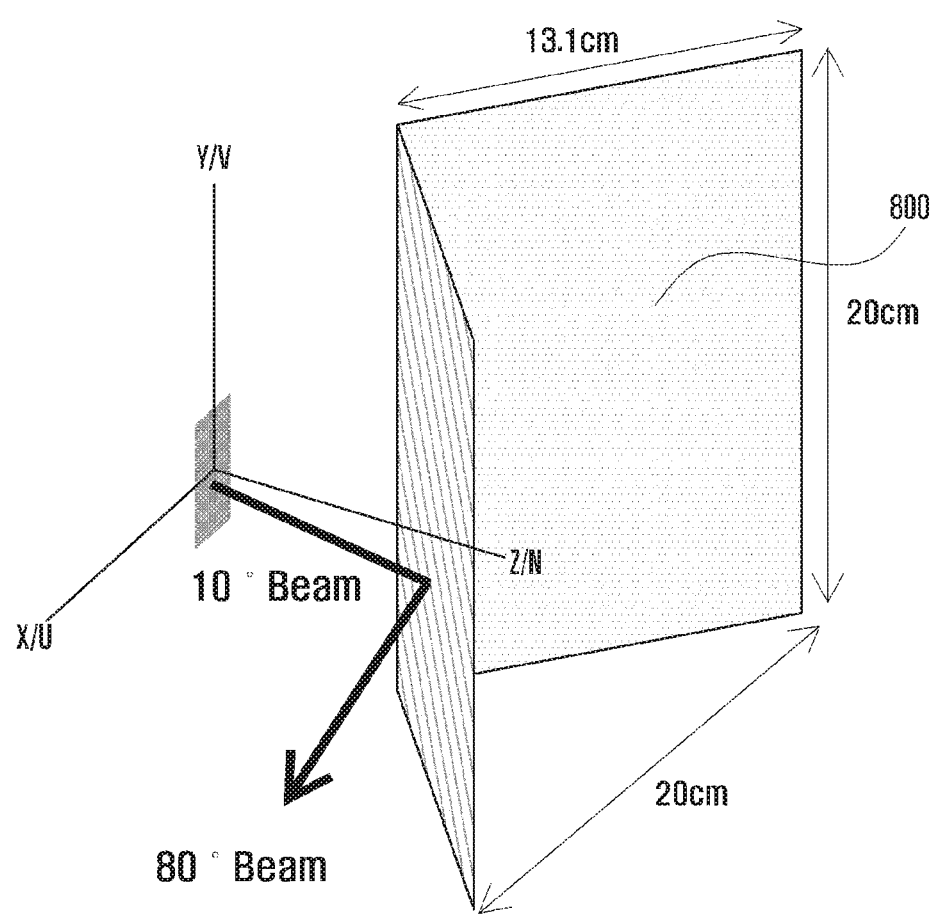
FIGS. 8A, 8B, and 8C are diagrams illustrating a reflection apparatus implemented in a V shape and a method for attaching the reflection apparatus to a window or a window frame according to various embodiments of the disclosure.
Figure 8B:
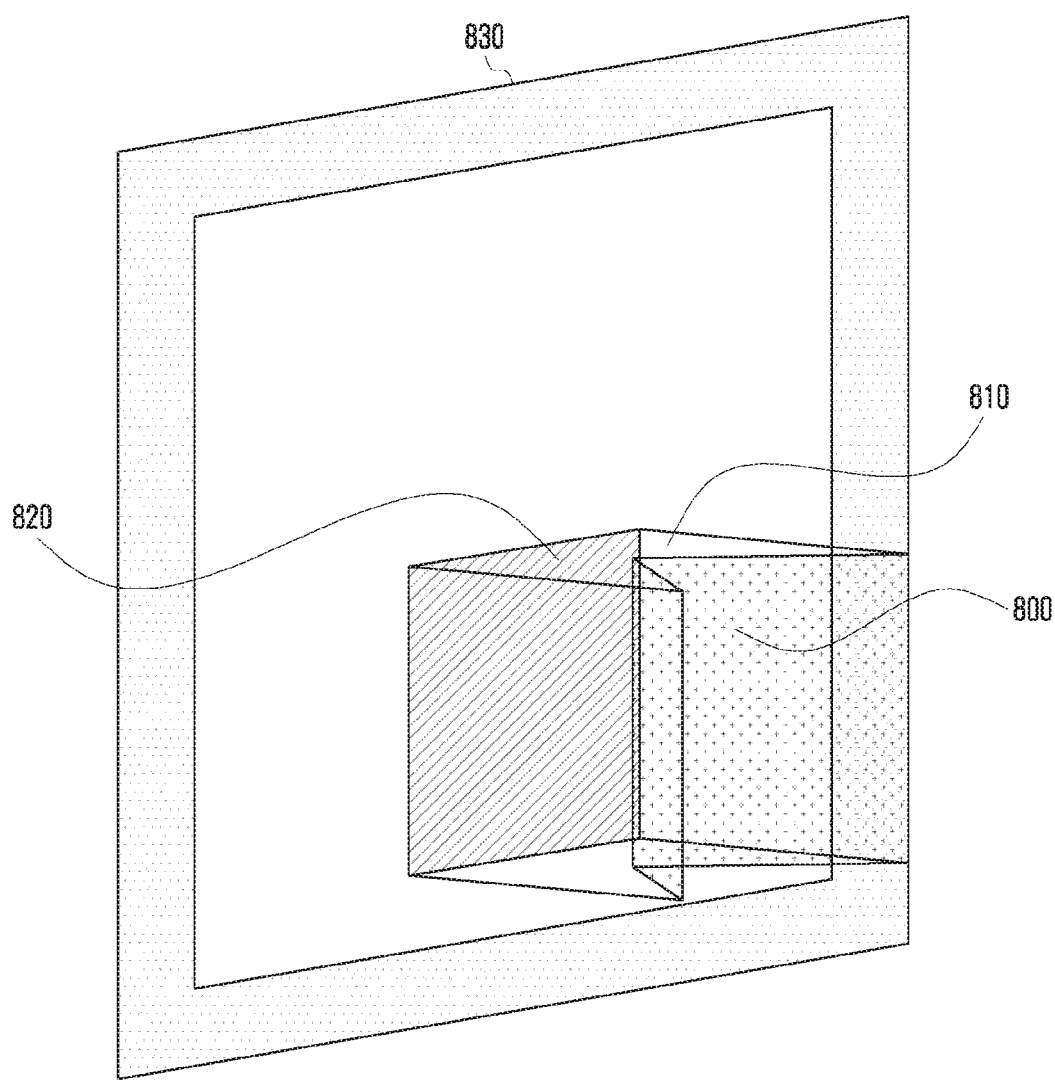
Figure 8C:
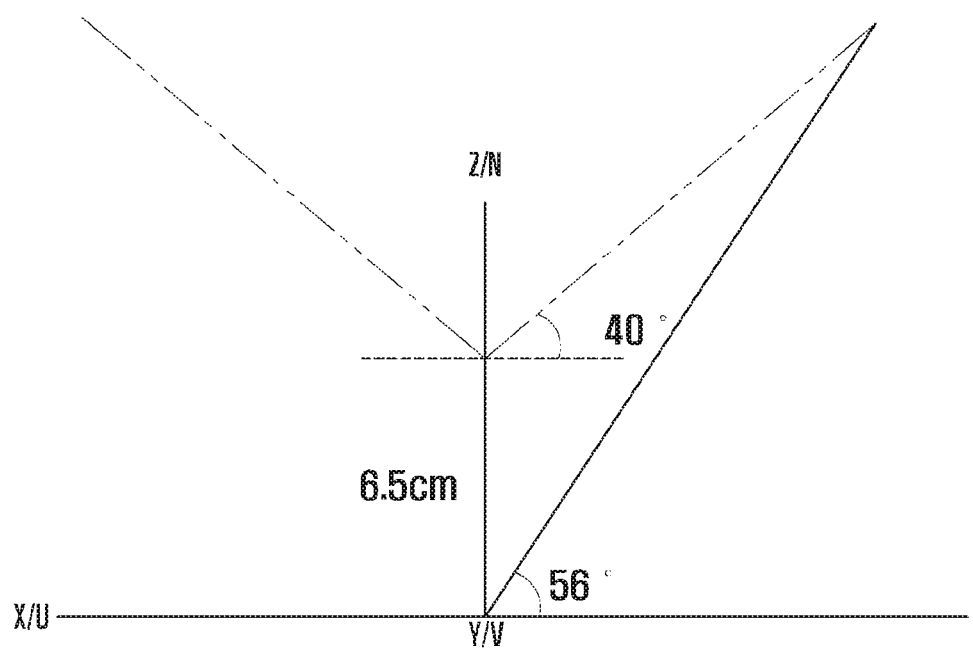

FIGS. 8A, 8B, and 8C, the reflection apparatus implemented in a V shape and a method for attaching the reflection apparatus to a window or a window frame will be described in detail.

Referring to FIG. 8A specifically shows the dimensions of a reflector 800 of the reflection apparatus, this is various only and not to be construed as a limitation.

In FIG. 8A, it is assumed that a glass window exists on the x-y plane and that a receiving entity such as a terminal is located on the opposite side of the reflector 800 with respect to the x-y plane. In this case, a beam transmitted by the receiving entity in the direction of 10 degrees inside the window may be reflected on the reflector 800 and thereby transmitted to the base station in the direction of 80 degrees. On the other hand, a beam transmitted by the base station in the 80-degree direction may be reflected on the reflector 800 and transmitted to the receiving entity in the 10-degree direction.

Referring to FIG. 8B shows an embodiment in which the reflector 800 is attached to a glass window 830.

A reflection apparatus 810 including the reflector 800 may further include a fixing member 820. The fixing member 820 allows the reflector 800 to be fixed to and spaced apart from the glass window 830. The reflection apparatus 810 including the reflector 800 and the fixing member 820 may be formed of a transparent material that does not reflect a beam.

Therefore, when the reflector 800 forms an angle of 100 degrees as shown in FIG. 8C, a beam incident at a certain angle between −50 degrees and 50 degrees in the Z direction toward the reflector 800 may penetrate the reflector 800 and be then transmitted to the inside of the glass window 830. In addition, as shown in FIG. 8C, a beam having an absolute value of an incident angle exceeding 50 degrees in the Z direction may be reflected by the reflector 800 and then transmitted to the inside of the glass window 830.

Figure 12:
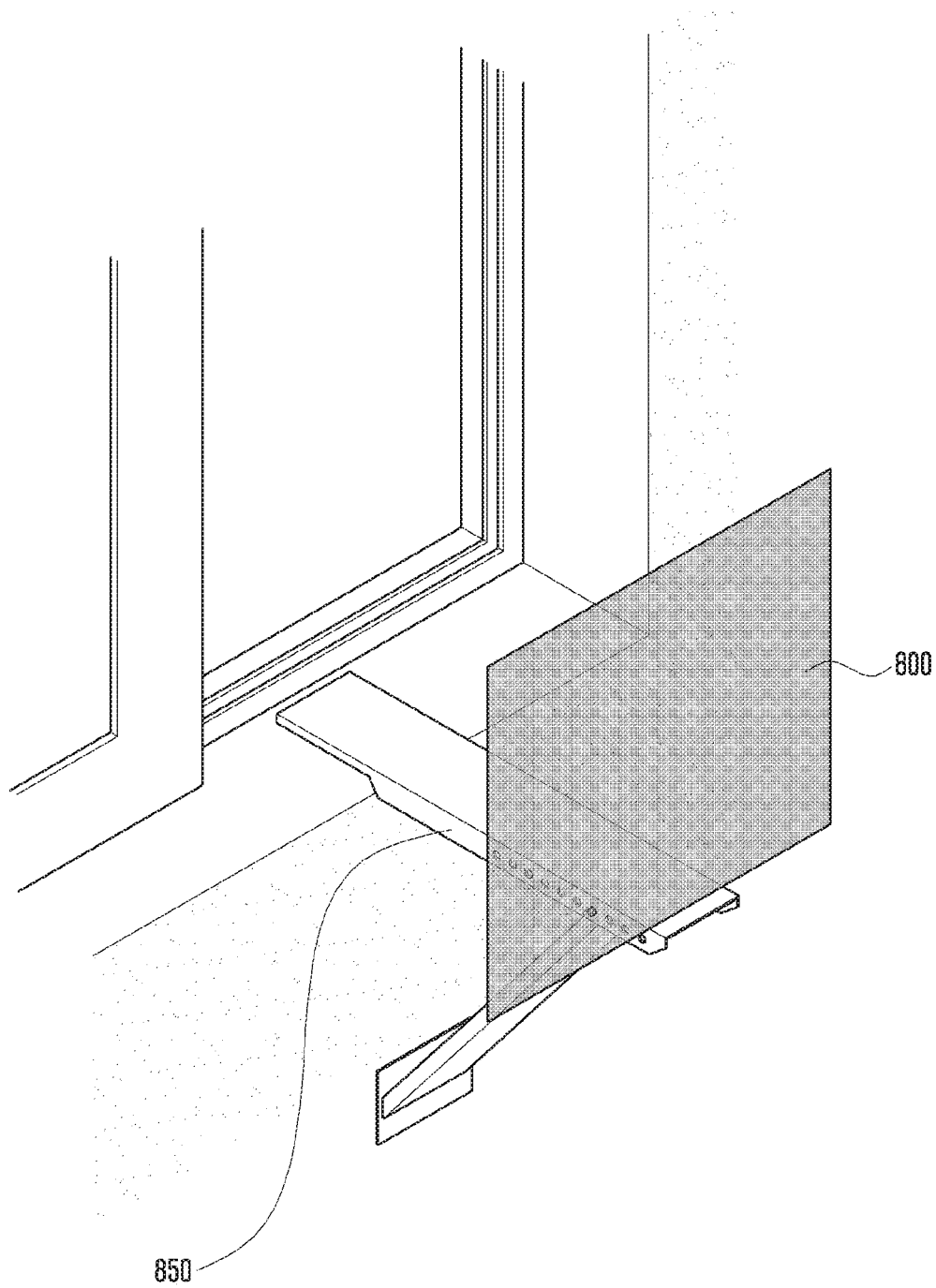
FIG. 12 is a diagram illustrating a reflector installed using a bracket according to an embodiment of the disclosure.

FIG. 12 is a diagram illustrating a reflector installed using a bracket according to an embodiment of the disclosure.

Meanwhile, in order to install the reflector 800, a separate member such as a bracket 850 may be used as shown in FIG. 12. Specifically, when there is no wall surface suitable for the installation of the reflector 800, or when it is difficult to attach the reflector 800 to the glass window 830, the bracket 850 or any equivalent may be used for installing the reflector 800 at a desired position.

For example, as shown, the bracket 850 may be fixed to a window frame and an inner wall. The reflector 800 may be mounted on a portion of the bracket 850. At this time, a position where the reflector 800 is mounted may be fixed or variable. Further, a reflection angle of the reflector 800 may be adjusted through the use of a variable structure of the bracket 850. Also, the reflector 800 may have various forms such as a semi-cylindrical form, a cylindrical form, a conical form, a planar form, a V-shaped form, and the like.

In addition, as described above with reference to FIGS. 10A to 10I, the reflector 800 installed using the bracket 850 may be also implemented in a variable shape. For example, as described above, a variable member for modifying the shape of the reflector 800 may be connected between the bracket 850 and the reflector 800.

While the disclosure has been shown and described with reference to various embodiments thereof, it will be understood by those skilled in the art that various changes in form and details may be made therein without departing from the spirt and scope of the disclosure as defined by the appended claims and their equivalents.

What is claimed is:

1. A reflector configured to change a direction of a beam incident in a first direction to a second direction, whereby a receiver spaced apart from an object receives the beam,
   wherein the reflector is attached to a specific position by a fixing member capable of controlling an attachment angle of the reflector to adjust the second direction.

2. The reflector of claim 1, comprising:
   a first cell group configured to change the direction of the beam to the second direction; and
   a second cell group configured to change the direction of the beam to a third direction.

3. The reflector of claim 1, wherein, when the receiver is positioned on an opposite side of a base station transmitting the beam with respect to the object, the reflector is configured to change the direction of the beam such that the receiver receives the beam.

4. The reflector of claim 1, wherein, when the object blocks a penetration of the beam, the reflector is located on an opposite side of a source of the beam with respect to the object.

5. The reflector of claim 1, comprising:
   a fixing member configured to fix the reflector to a specific position,
   wherein the reflector protrudes in a direction opposite to the fixing member and has a curved surface to disperse the incident beam in a plurality of directions.

6. The reflector of claim 1, wherein, when the object is formed of a glass material and when the beam incident in the first direction has an incident angle greater than a first angle with respect to a direction perpendicular to the object, the reflector is configured to change the direction of the beam such that the beam penetrates the object within a second angle.

7. The reflector of claim 1, wherein, when the object is a glass window, the reflector is formed of a V shape such that a plane formed by a vertex line of the V-shaped reflector and a center line of the receiver is perpendicular to the glass window.

8. The reflector of claim 1, wherein, when the object is a glass window, the specific position is a position of a window frame of the glass window.

9. The reflector of claim 1, wherein the beam is at least one of a fifth generation (5G) wireless communication beam or a beam in a millimeter wave (mmWave) band.

10. The reflector of claim 1,
    wherein the object is positioned between the receiver and a base station transmitting the beam, and
    wherein the object at least partially blocks the beam transmitted by the base station from being directly received by the receiver.

11. An apparatus comprising:
    a reflector configured to change a direction of a beam incident in a first direction to a second direction, whereby a receiver spaced apart from an object receives the beam; and
    a fixing member that attaches the reflector to a specific position and is capable of controlling an attachment angle of the reflector to adjust the second direction.

12. The apparatus of claim 11, wherein the reflector includes:
    a first cell group configured to change the direction of the beam to the second direction; and
    a second cell group configured to change the direction of the beam to a third direction.

13. The apparatus of claim 11, wherein, when the receiver is positioned on an opposite side of a base station transmitting the beam with respect to the object, the reflector is configured to change the direction of the beam such that the receiver receives the beam.

14. The apparatus of claim 11, wherein, when the object blocks a penetration of the beam, the reflector is located on an opposite side of a source of the beam with respect to the object.

15. The apparatus of claim 11, wherein the reflector protrudes in a direction opposite to the fixing member and has a curved surface to disperse the incident beam in a plurality of directions.

16. The apparatus of claim 11, wherein, when the object is formed of a glass material and when the beam incident in the first direction has an incident angle greater than a first angle with respect to a direction perpendicular to the object, the reflector is configured to change the direction of the beam such that the beam penetrates the object within a second angle.

17. The apparatus of claim 11,
wherein, when the object is a glass window, the reflector is formed of a V shape such that a plane formed by a vertex line of the V-shaped reflector and a center line of the receiver is perpendicular to the glass window, and
wherein the fixing member is attached to the glass window so as to fix the reflector to the glass window.

18. The apparatus of claim 11, wherein, when the object is a glass window, the specific position is a position of a window frame of the glass window.

19. The apparatus of claim 11, wherein the beam is at least one of a fifth generation (5G) wireless communication beam or a beam in a millimeter wave (mmWave) band.

20. The apparatus of claim 11,
wherein the object is positioned between the receiver and a base station transmitting the beam, and
wherein the object at least partially blocks the beam transmitted by the base station from being directly received by the receiver.

\* \* \* \* \*